(12) United States Patent
Park et al.

(10) Patent No.: US 10,380,776 B2
(45) Date of Patent: Aug. 13, 2019

(54) GLASS-TYPE MOBILE TERMINAL

(71) Applicant: LG ELECTRONICS INC., Seoul (KR)

(72) Inventors: Mihyun Park, Seoul (KR); Hyunok Lee, Seoul (KR); Youngho Sohn, Seoul (KR); Mansoo Sin, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 94 days.

(21) Appl. No.: 15/332,560

(22) Filed: Oct. 24, 2016

(65) Prior Publication Data

US 2017/0345194 A1 Nov. 30, 2017

(30) Foreign Application Priority Data

May 31, 2016 (KR) .................. 10-2016-0066941

(51) Int. Cl.
*G06T 3/20* (2006.01)
*G06T 3/60* (2006.01)
*A63F 13/42* (2014.01)
*G02B 27/01* (2006.01)
*G06T 11/60* (2006.01)
*H04N 13/344* (2018.01)

(52) U.S. Cl.
CPC .............. *G06T 11/60* (2013.01); *A63F 13/42* (2014.09); *G02B 27/017* (2013.01); *G06T 3/20* (2013.01); *G06T 3/60* (2013.01); *H04N 13/344* (2018.05); *A63F 2300/8082* (2013.01); *G02B 2027/0138* (2013.01); *G02B 2027/0178* (2013.01); *G06T 2210/62* (2013.01)

(58) Field of Classification Search
None
See application file for complete search history.

(56) References Cited

U.S. PATENT DOCUMENTS

| 2009/0073081 A1* | 3/2009 | Kakizaki ............... G02B 27/01 345/7 |
|---|---|---|
| 2013/0335301 A1 | 12/2013 | Wong et al. |
| 2015/0024368 A1 | 1/2015 | King, Jr. |
| 2016/0027212 A1 | 1/2016 | Da Veiga et al. |
| 2016/0042567 A1 | 2/2016 | Shuster et al. |

OTHER PUBLICATIONS

Neth, Christian T., et al. "Velocity-dependent dynamic curvature gain for redirected walking." IEEE transactions on visualization and computer graphics 18.7 (2012): 1041-1052. (Year: 2012).*
Williams et al., "Updating Orientation in Large Virtual Environments Using Scaled Translational Gain", Applied Perception in Graphics and Visualization, Jul. 28-29, 2006, pp. 21-28 ( 9 pages total).

* cited by examiner

*Primary Examiner* — Xin Sheng
(74) *Attorney, Agent, or Firm* — Birch, Stewart, Kolasch & Birch, LLP

(57) ABSTRACT

A glass-type mobile terminal including a display configured to display a virtual reality image thereon; and a controller configured to detect an object around the glass-type mobile terminal while the virtual reality image is displayed on the display, and modify the virtual reality image if the detected object is a dangerous element so a viewer viewing the virtual reality image avoids the dangerous element.

18 Claims, 20 Drawing Sheets

<Vertual Reality Video>

GLASS-TYPE MOBILE TERMINAL

CROSS-REFERENCE TO RELATED APPLICATION

This application claims the benefit of Korea patent application No. 10-2016-0066941 filed on May 31, 2016, the entire content of which is incorporated herein by reference for all purposes as if fully set forth herein.

BACKGROUND OF THE INVENTION

Field of the Present Disclosure

The present disclosure relates to a glass-type mobile terminal, and, more particularly, to a glass-type mobile terminal that inserts an image corresponding to a detected dangerous object into a virtual reality image while viewing the virtual reality image.

Discussion of the Related Art

Terminals may be generally classified as mobile/portable terminals or stationary terminals. Mobile terminals may also be classified as handheld terminals or vehicle mounted terminals. Mobile terminals have become increasingly more functional. Examples of such functions include data and voice communications, capturing images and video via a camera, recording audio, playing music files via a speaker system, and displaying images and video on a display.

Some mobile terminals include additional functionality including game playing, while other terminals are configured as multimedia players. More recently, mobile terminals have been configured to receive broadcast and multicast signals which permit viewing of content such as videos and television programs.

As such functions become more diversified, the mobile terminal supports more complicated functions such as capturing images or video, reproducing music or video files, playing games, receiving broadcast signals, and the like. By comprehensively and collectively implementing such functions, the mobile terminal is embodied in the form of a multimedia player or device.

Recently, a glass-type mobile terminal mounted on a head of the user can render a virtual reality image thereon. However, while viewing the virtual reality image on the glass-type mobile terminal having a non-transparent display unit, the movement of the user may lead to a collision with an object.

SUMMARY OF THE INVENTION

Accordingly, one object of the present disclosure is to provide a glass-type mobile terminal configured to modify the virtual reality image while viewing the virtual reality image on the glass-type mobile terminal, to prevent the user from colliding with an object around the user.

Another object of the present disclosure is to provide a glass-type mobile terminal configured to adjust a response sensitivity of the virtual input image to an input from a user input device while viewing the virtual reality image on the glass-type mobile terminal, to prevent the user from colliding with an object around the user.

To achieve these and other advantages and in accordance with the purpose of the present invention, as embodied and broadly described herein, the present invention provides in one aspect a glass-type mobile terminal including a display configured to display a virtual reality image thereon; and a controller configured to detect an object around the glass-type mobile terminal while the virtual reality image is displayed on the display, and modify the virtual reality image if the detected object is a dangerous element so a viewer viewing the virtual reality image avoids the dangerous element. The present invention also provides a corresponding method of controlling a glass-type mobile terminal.

Further scope of applicability of the present invention will become apparent from the detailed description given hereinafter. However, the detailed description and specific examples, while indicating preferred embodiments of the invention, are given by illustration only, since various changes and modifications within the spirit and scope of the invention will become apparent to those skilled in the art from this detailed description.

BRIEF DESCRIPTIONS OF THE DRAWINGS

The present invention will become more fully understood from the detailed description given herein below and the accompanying drawings, which are given by illustration only, and thus are not limitative of the present invention, and wherein.

DETAILED DESCRIPTION OF THE EMBODIMENTS

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Although the terms first, second, etc. may be used herein to describe various elements, these elements should not be limited by these terms. These terms are generally only used to distinguish one element from another.

It will be understood that if an element is referred to as being "connected with" another element, the element may be connected with the other element or intervening elements may also be present. In contrast, if an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
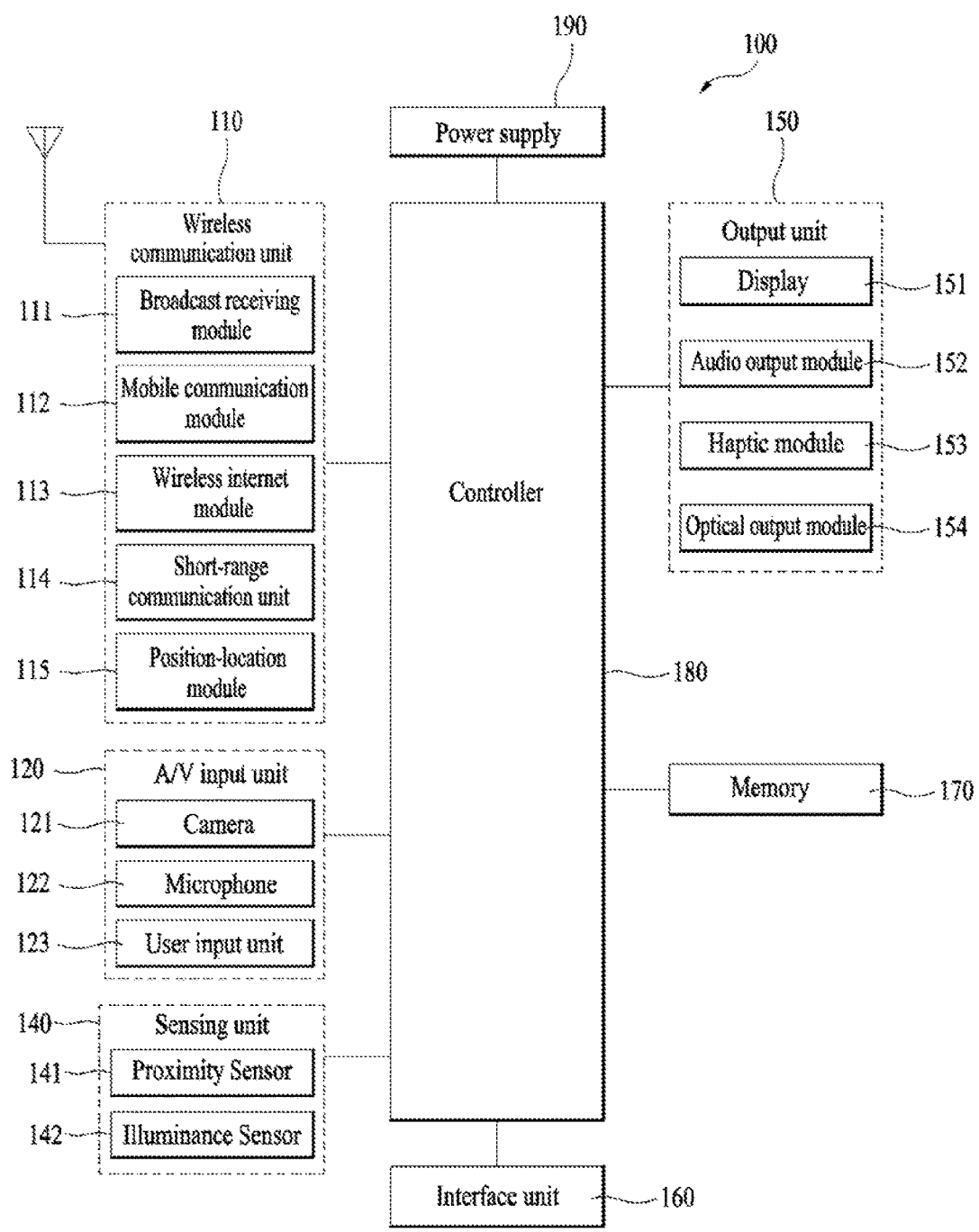
FIG. 1A is a block diagram of a mobile terminal according to an embodiment of the present disclosure.
Figure 1B:
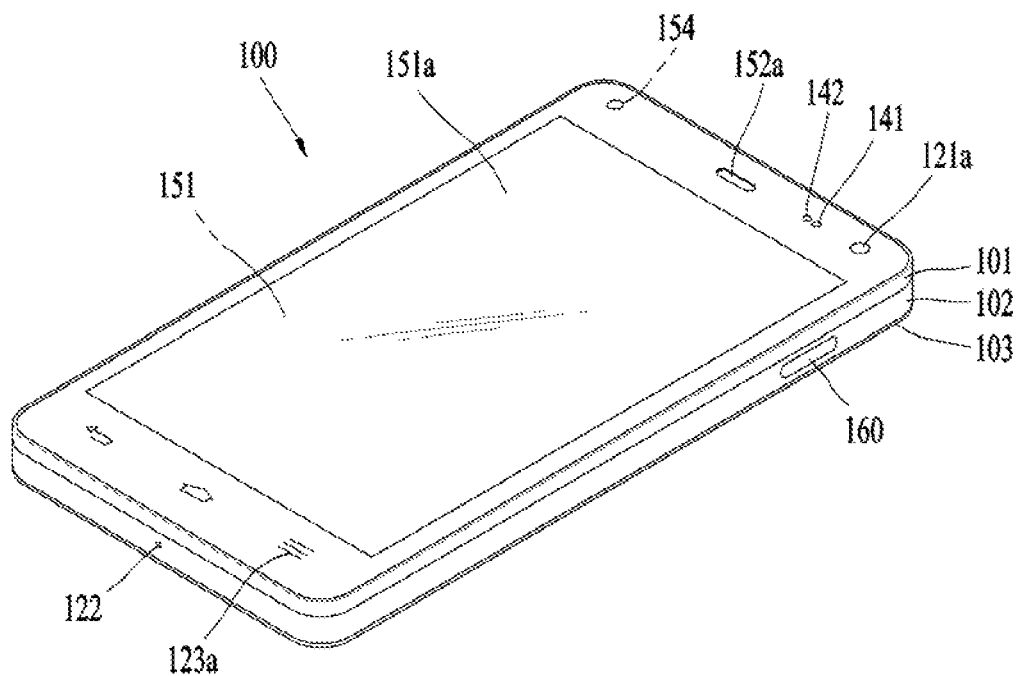
FIGS. 1B and 1C are conceptual views of one example of the mobile terminal, viewed from different directions.
Figure 1C:
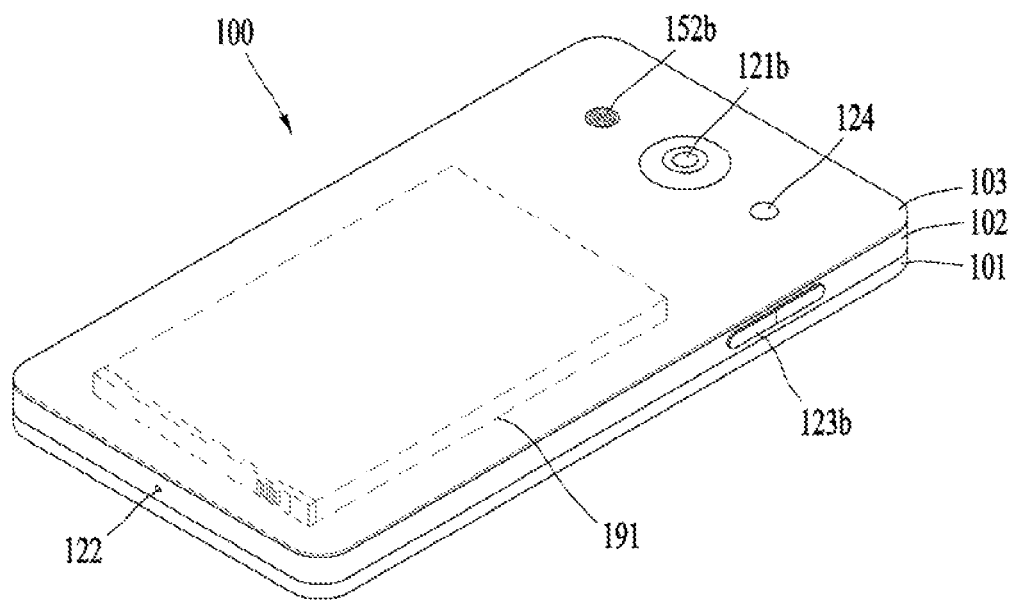

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply 190. Implementing all of the illustrated components is not a requirement, and that greater or fewer components may alternatively be implemented.

Referring now to FIG. 1A, the mobile terminal 100 is shown having wireless communication unit 110 configured with several commonly implemented components. For instance, the wireless communication unit 110 typically includes one or more components which permit wireless communication between the mobile terminal 100 and a wireless communication system or network within which the mobile terminal is located.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a position-location module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to detect internal information of the mobile terminal, the surrounding environment of the mobile terminal, user information, and the like. For example, in FIG. 1A, the sensing unit 140 is shown having a proximity sensor 141 and an illumination sensor 142.

If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display 151, an audio output module 152, a haptic module 153, and an optical output module 154.

The display 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that may be connected to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, transmitting a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 can provide or process information or functions appropriate for a user by processing signals, data, information and the like, which are input or output by the various components depicted in FIG. 1A, or activating application programs stored in the memory 170. As one example, the controller 180 controls some or all of the components illustrated in FIGS. 1A-1C according to the execution of an application program that have been stored in the memory 170.

The power supply 190 may be configured to receive external power or provide internal power in order to supply appropriate power required for operating elements and components included in the mobile terminal 100. The power supply 190 may include a battery, and the battery may be embedded in the terminal body, or configured to be detachable from the terminal body.

Referring still to FIG. 1A, various components depicted in this figure will now be described in more detail. Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be a server which generates and transmits a broadcast signal and/or broadcast associated information, or a server which receives a pre-generated broadcast signal and/or broadcast associated information, and transmits such items to the mobile terminal.

The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 may receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this instance, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 may transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like). Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally connected to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, if the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may detect or recognize the wearable device, and permit communication between the wearable device and the mobile terminal 100. In addition, if the detected wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, if a call is received in the mobile terminal 100, the user may answer the call using the wearable device. Also, if a message is received in the mobile terminal 100, the user may check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, if the mobile terminal uses a GPS module, a position of the mobile terminal may be acquired using a signal sent from a GPS satellite. As another example, if the mobile terminal uses the Wi-Fi module, a position of the mobile terminal may be acquired based on information related to a wireless access point (AP) which transmits or receives a wireless signal to or from the Wi-Fi module.

The input unit 120 may permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames may be displayed on the display 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input may be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to detect one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to detect presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. If the touch screen is implemented as a capacitance type, the proximity sensor 141 may detect proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may detect proximity touch, and proximity touch patterns (for example, distance, direction, speed, time, position, moving status, and the like).

In general, controller 180 processes data corresponding to proximity touches and proximity touch patterns detected by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor may detect a touch applied to the touch screen, such as display 151, using any of a variety of touch methods. Examples of such touch methods include a resistive type, a capacitive type, an infrared type, and a magnetic field type, among others.

As one example, the touch sensor may convert changes of pressure applied to a specific part of the display 151, or convert capacitance occurring at a specific part of the display 151, into electric input signals. The touch sensor may also be configured to detect not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

If a touch input is detected by a touch sensor, corresponding signals may be transmitted to a touch controller. The touch controller may process the received signals, and then transmit corresponding data to the controller 180. Accordingly, the controller 180 can detect which region of the display 151 has been touched. Here, the touch controller may be a component separate from the controller 180, the controller 180, and combinations thereof.

In some embodiments, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to detect various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information detected by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor. Implementing the camera 121 with a laser sensor allows detection of a touch of a physical object with respect to a 3D stereoscopic image. The photo sensor may be laminated on, or overlapped with, the display device. The photo sensor may sense movement of the physical object in proximity to the touch screen. In more detail, the photo sensor may include photo diodes and transistors at rows and columns to sense content received at the photo sensor using an electrical signal which changes according to the quantity of applied light. Namely, the photo sensor may calculate the coordinates of the physical object according to variation of light to thus obtain position information of the physical object.

The display 151 is generally configured to output information processed in the mobile terminal 100. For example, the display 151 may display execution screen information of an application program executing at the mobile terminal 100 or user interface (UI) and graphic user interface (GUI) information in response to the execution screen information.

In some embodiments, the display 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method may be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail may be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space detect.

A left image and a right image required for implementing a 3D stereoscopic image may be displayed on the stereoscopic display unit using a stereoscopic processing unit. The stereoscopic processing unit may receive the 3D image and extract the left image and the right image, or may receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output while modes such as a signal reception mode, a call mode, a record mode, a voice recognition mode, a broadcast reception mode, and the like. The audio output module 152 may provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 may be configured to generate various tactile effects that a user feels, perceive, or otherwise experience. A typical example of a tactile effect generated by the haptic module 153 is vibration. The strength, pattern and the like of the vibration generated by the haptic module 153 may be controlled by user selection or setting by the controller. For example, the haptic module 153 may output different vibrations in a combining manner or a sequential manner.

Besides vibration, the haptic module 153 may generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the detect of cold and warmth using an element that may absorb or generate heat, and the like.

The haptic module 153 may also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 may output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal detects that a user has checked the generated event, for example.

The interface unit 160 serves as an interface for external devices to be connected with the mobile terminal 100. For example, the interface unit 160 may receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device may be connected with the terminal 100 via the interface unit 160.

If the mobile terminal 100 is connected with an external cradle, the interface unit 160 may serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 may store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control the general operations of the mobile terminal 100. For example, the controller 180 can set or release a lock state for restricting a user from inputting a control command with respect to applications if a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply 190 receives external power or provide internal power and supply the appropriate power required for operating respective elements and components included in the mobile terminal 100. The power supply 190 may include a battery, which is typically rechargeable or be detachably connected to the terminal body for charging.

The power supply 190 may include a connection port. The connection port may be configured as one example of the interface unit 160 to which an external charger for supplying power to recharge the battery is electrically connected.

As another example, the power supply 190 may recharge the battery in a wireless manner without use of the connection port. In this example, the power supply 190 may receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glass-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glass-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display 151 is shown located on the front side of the terminal body to output information. As illustrated, a window 151a of the display 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably connected to the rear case 102. Therefore, if the rear cover 103 is detached from the rear case 102, the electronic components mounted to the rear case 102 are externally exposed.

As illustrated, if the rear cover 103 is connected to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this example, a mobile terminal 100 having a uni-body is formed so synthetic resin or metal extends from a side surface to a rear surface.

If desired, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space if those cases are connected.

The mobile terminal includes a display 151, a first and a second audio output modules 151a/151b, a proximity sensor 141, an illumination sensor 142, an optical output module 154, a first and a second cameras 121a/121b, a first and a second manipulation units 123a/123b, a microphone 122, interface unit 160 and the like.

It will be described for the mobile terminal as shown in FIGS. 1B and 1C. The display 151, the first audio output module 151a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 151b and the second camera 121b are arranged in rear surface of the terminal body.

However, alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display 151 outputs information processed in the mobile terminal 100. The display 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display 151 may be implemented using two display devices, which may implement the same or different display technology. For instance, a plurality of the display units 151 may be arranged on one side, either spaced apart from each other, or these devices may be integrated, or these devices may be arranged on different surfaces.

The display 151 may also include a touch sensor which detects a touch input received at the display unit. If a touch is input to the display 151, the touch sensor may detect this touch and the controller 180, for example, may generate a control command or other signal corresponding to the touch. The content which is input in the touching manner may be a text or numerical value, or a menu item which may be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display 151 may also form a touch screen together with the touch sensor. Here, the touch screen may serve as the user input unit 123 (see FIG. 1A). Therefore, the touch screen may replace at least some of the functions of the first manipulation unit 123a. The first audio output module 152a may be implemented in the form of a speaker to output voice audio, alarm sounds, multimedia audio reproduction, and the like.

The window 151a of the display 151 will typically include an aperture to permit audio generated by the first audio output module 152a to pass. One alternative is to allow audio to be released along an assembly gap between the structural bodies (for example, a gap between the window 151a and the front case 101). In this instance, a hole independently formed to output audio sounds may not be seen or is otherwise hidden in terms of appearance, thereby further simplifying the appearance and manufacturing of the mobile terminal 100.

The optical output module 154 may be configured to output light for indicating an event generation. Examples of such events include a message reception, a call signal reception, a missed call, an alarm, a schedule notice, an email reception, information reception through an application, and the like. If a user has checked a generated event, the controller may control the optical output unit 154 to stop the light output.

The first camera 121a may process image frames such as still or moving images obtained by the image sensor in a capture mode or a video call mode. The processed image frames may then be displayed on the display 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof. Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display 151, or the like.

As another example of the user input unit 123, a rear input unit may be located on the rear surface of the terminal body. The rear input unit may be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display 151, and the like. The rear input unit may permit touch input, a push input, or combinations thereof.

The rear input unit may be located to overlap the display 151 of the front side in a thickness direction of the terminal body. As one example, the rear input unit may be located on an upper end portion of the rear side of the terminal body such that a user may easily manipulate it using a forefinger if the user grabs the terminal body with one hand. Alternatively, the rear input unit may be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display 151 may have a larger screen.

As a further alternative, the mobile terminal 100 may include a finger sensor which senses a user's fingerprint. The controller 180 can then use fingerprint information detected by the finger sensor as part of an authentication procedure. The finger sensor may also be installed in the display 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b may include a plurality of lenses arranged along at least one line. The plurality of lenses may also be arranged in a matrix configuration. The cameras may be referred to as an "array camera." If the second camera 121b is implemented as an array camera, images may be captured in various manners using the plurality of lenses and images with better qualities.

As shown in FIG. 1C, a flash 124 is shown adjacent to the second camera 121b. If an image of a subject is captured with the camera 121b, the flash 124 may illuminate the subject. As shown in FIG. 1C, the second audio output module 152b may be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply 190 for supplying power to the mobile terminal 100 may include a battery 191, which is mounted in the terminal body or detachably connected to an outside of the terminal body. The battery 191 may receive power via a power source cable connected to the interface unit 160. Also, the battery 191 may be recharged in a wireless manner using a wireless charger. Wireless charging may be implemented by magnetic induction or electromagnetic resonance.

The rear cover 103 is shown connected to the rear case 102 for shielding the battery 191, to prevent separation of the battery 191, and to protect the battery 191 from an external impact or from foreign material. If the battery 191 is detachable from the terminal body, the rear case 103 may be detachably connected to the rear case 102.

An accessory for protecting an appearance or assisting or extending the functions of the mobile terminal 100 may also be provided on the mobile terminal 100. As one example of an accessory, a cover or pouch for covering or accommodating at least one surface of the mobile terminal 100 may be provided. The cover or pouch may cooperate with the display 151 to extend the function of the mobile terminal 100. Another example of the accessory is a touch pen for assisting or extending a touch input to a touch screen.

Figure 2:
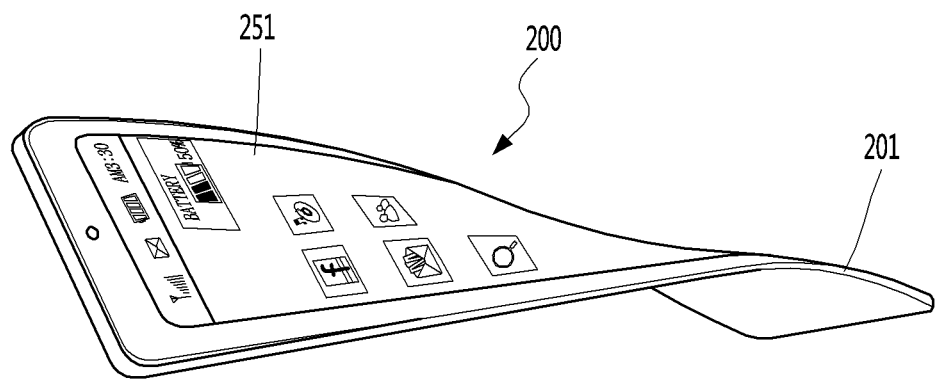
FIG. 2 is a conceptual view of a deformable mobile terminal according to an alternative embodiment of the present disclosure.

FIG. 2 is a conceptual view of a deformable mobile terminal according to an alternative embodiment of the present invention. In this figure, mobile terminal 200 is shown having display unit 251, which is a type of display that is deformable by an external force. This deformation, which includes display unit 251 and other components of mobile terminal 200, may include any of curving, bending, folding, twisting, rolling, and combinations thereof. The deformable display unit 251 may also be referred to as a "flexible display unit." In some implementations, the flexible display unit 251 may include a general flexible display, electronic paper (also known as e-paper), and combinations thereof. In general, mobile terminal 200 may include features that are the same or similar to that of mobile terminal 100 of FIGS. 1A-1C.

The flexible display of mobile terminal 200 is generally formed as a lightweight, non-fragile display, which still exhibits characteristics of a conventional flat panel display, but is instead fabricated on a flexible substrate which may be deformed as noted previously.

The term e-paper may be used to refer to a display technology employing the characteristic of a general ink, and is different from the conventional flat panel display in view of using reflected light. E-paper is generally understood as changing displayed information using a twist ball or via electrophoresis using a capsule.

If when the flexible display unit 251 is not deformed (for example, in a state with an infinite radius of curvature and referred to as a first state), a display region of the flexible display unit 251 includes a generally flat surface. When the flexible display unit 251 is deformed from the first state by an external force (for example, a state with a finite radius of curvature and referred to as a second state), the display region may become a curved surface or a bent surface. As illustrated, information displayed in the second state may be visual information output on the curved surface. The visual information may be realized so a light emission of each unit pixel (sub-pixel) arranged in a matrix configuration is controlled independently. The unit pixel denotes an elementary unit for representing one color.

According to one alternative embodiment, the first state of the flexible display unit 251 may be a curved state (for example, a state of being curved from up to down or from right to left), instead of being in flat state. In this embodiment, if an external force is applied to the flexible display unit 251, the flexible display unit 251 may transition to the second state such that the flexible display unit is deformed into the flat state (or a less curved state) or into a more curved state.

If desired, the flexible display unit 251 may implement a flexible touch screen using a touch sensor in combination with the display. If a touch is received at the flexible touch screen, the controller 180 can execute certain control corresponding to the touch input. In general, the flexible touch screen is configured to detect touch and other input while in both the first and second states.

One option is to configure the mobile terminal 200 to include a deformation sensor which detects the deforming of the flexible display unit 251. The deformation sensor may be included in the sensing unit 140.

The deformation sensor may be located in the flexible display unit 251 or the case 201 to detect information related to the deforming of the flexible display unit 251. Examples of such information related to the deforming of the flexible display unit 251 may be a deformed direction, a deformed degree, a deformed position, a deformed amount of time, an acceleration that the deformed flexible display unit 251 is restored, and the like. Other possibilities include most any type of information which may be detected in response to the curving of the flexible display unit or detected while the flexible display unit 251 is transitioning into, or existing in, the first and second states.

In some embodiments, controller 180 or other component may change information displayed on the flexible display unit 251, or generate a control signal for controlling a function of the mobile terminal 200, based on the information related to the deforming of the flexible display unit 251. Such information is typically detected by the deformation sensor.

The mobile terminal 200 is shown having a case 201 for accommodating the flexible display unit 251. The case 201 may be deformable together with the flexible display unit 251, taking into account the characteristics of the flexible display unit 251.

A battery located in the mobile terminal 200 may also be deformable in cooperation with the flexible display unit 261, taking into account the characteristic of the flexible display unit 251. One technique to implement such a battery is to use a stack and folding method of stacking battery cells.

The deformation of the flexible display unit 251 not limited to perform by an external force. For example, the flexible display unit 251 may be deformed into the second state from the first state by a user command, application command, or the like.

In accordance with still further embodiments, a mobile terminal may be configured as a device which is wearable on a human body. Such devices go beyond the usual technique of a user grasping the mobile terminal using their hand. Examples of the wearable device include a smart watch, a smart glass, a head mounted display (HMD), and the like.

A typical wearable device may exchange data with (or cooperate with) another mobile terminal 100. In such a device, the wearable device generally has functionality that is less than the cooperating mobile terminal. For instance, the short-range communication module 114 of a mobile terminal 100 may detect or recognize a wearable device that is near-enough to communicate with the mobile terminal. In addition, if the detected wearable device is a device which is authenticated to communicate with the mobile terminal 100, the controller 180 can transmit data processed in the mobile terminal 100 to the wearable device via the short-range communication module 114, for example.

Hence, a user of the wearable device may use the data processed in the mobile terminal 100 on the wearable device. For example, if a call is received in the mobile terminal 100, the user may answer the call using the wearable device. Also, if a message is received in the mobile terminal 100, the user may check the received message using the wearable device.

Figure 3:
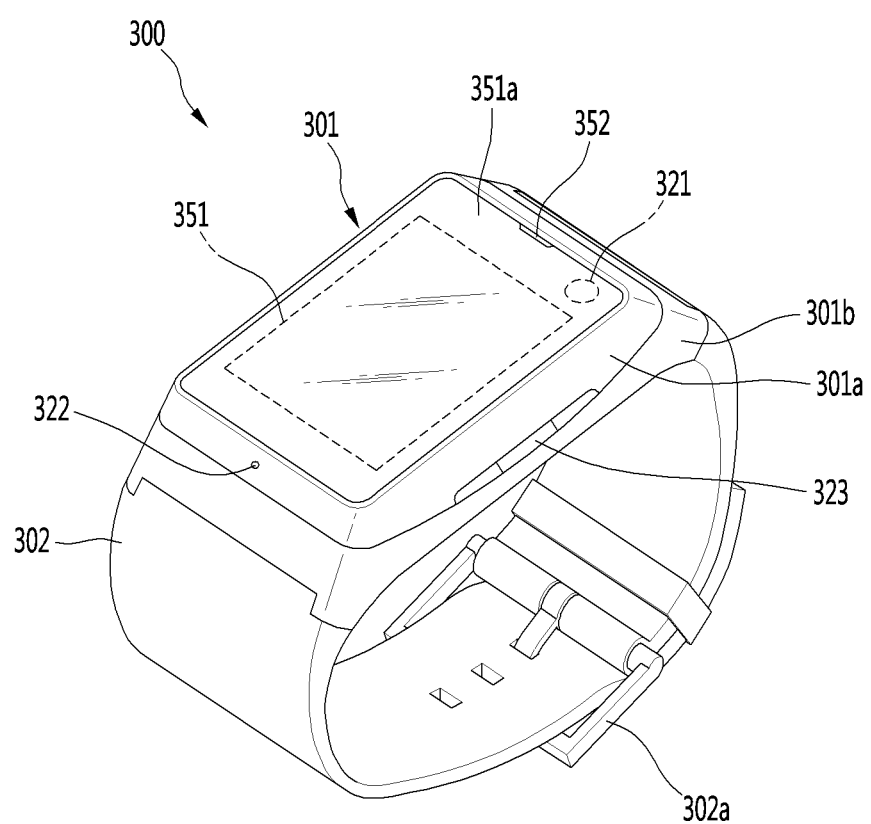
FIG. 3 is a conceptual view of a wearable mobile terminal according to another alternative embodiment of the present disclosure.

FIG. 3 is a perspective view illustrating one example of a watch-type mobile terminal 300 in accordance with another exemplary embodiment. As illustrated in FIG. 3, the watch-type mobile terminal 300 includes a main body 301 with a display unit 351 and a band 302 connected to the main body 301 to be wearable on a wrist. In general, mobile terminal 300 may include features that are the same or similar to that of mobile terminal 100 of FIGS. 1A-1C.

The main body 301 may include a case having a certain appearance. As illustrated, the case may include a first case 301a and a second case 301b cooperatively defining an inner space for accommodating various electronic components. Other configurations are possible. For instance, a single case may alternatively be implemented, with such a case being configured to define the inner space, thereby implementing a mobile terminal 300 with a uni-body.

The watch-type mobile terminal 300 may perform wireless communication, and an antenna for the wireless communication may be installed in the main body 301. The antenna may extend its function using the case. For example, a case including a conductive material may be electrically connected to the antenna to extend a ground area or a radiation area.

The display unit 351 is shown located at the front side of the main body 301 so that displayed information is viewable to a user. In some embodiments, the display unit 351 includes a touch sensor so that the display unit may function as a touch screen. As illustrated, window 351a is positioned on the first case 301a to form a front surface of the terminal body together with the first case 301a.

The illustrated embodiment includes audio output module 352, a camera 321, a microphone 322, and a user input unit 323 positioned on the main body 301. If the display unit 351 is implemented as a touch screen, additional function keys may be minimized or eliminated. For example, if the touch screen is implemented, the user input unit 323 may be omitted.

The band 302 is commonly worn on the user's wrist and may be made of a flexible material for facilitating wearing of the device. As one example, the band 302 may be made of fur, rubber, silicon, synthetic resin, or the like. The band 302 may also be configured to be detachable from the main body 301. Accordingly, the band 302 may be replaceable with various types of bands according to a user's preference.

In one configuration, the band 302 may be used for extending the performance of the antenna. For example, the band may include therein a ground extending portion electrically connected to the antenna to extend a ground area.

The band 302 may include fastener 302a. The fastener 302a may be implemented into a buckle type, a snap-fit hook structure, a Velcro® type, or the like, and include a flexible section or material. The drawing illustrates an example that the fastener 302a is implemented using a buckle.

Figure 4:
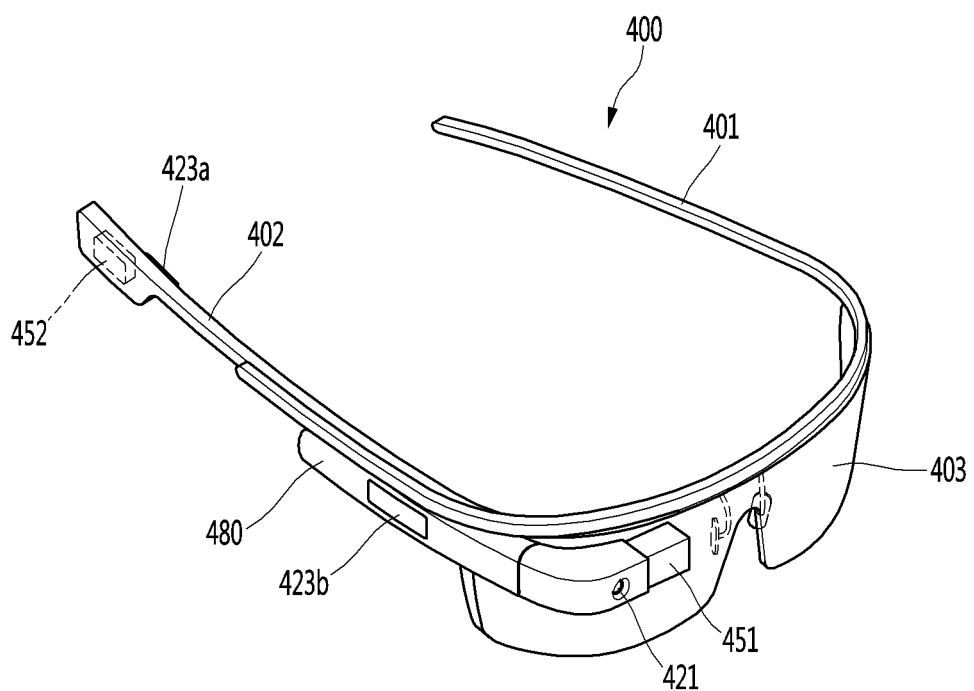
FIG. 4 is a conceptual view of a wearable mobile terminal according to another alternative embodiment of the present disclosure.

FIG. 4 is a perspective view illustrating one example of a glass-type mobile terminal 400 according to another exemplary embodiment. The glass-type mobile terminal 400 may be wearable on a head of a human body and provided with a frame (case, housing, etc.) therefor. The frame may be made of a flexible material to be easily worn. The frame of mobile terminal 400 is shown having a first frame 401 and a second frame 402, which may be made of the same or different materials. In general, mobile terminal 400 may include features that are the same or similar to that of mobile terminal 100 of FIGS. 1A-1C.

The frame may be supported on the head and defines a space for mounting various components. As illustrated, electronic components, such as a control module 480, an audio output module 452, and the like, may be mounted to the frame part. Also, a lens 403 for covering either or both of the left and right eyes may be detachably connected to the frame part.

The control module 480 controls various electronic components disposed in the mobile terminal 400. The control module 480 can be understood as a component corresponding to the aforementioned controller 180. FIG. 4 illustrates that the control module 480 is installed in the frame part on one side of the head, but other locations are possible.

The display unit 451 may be implemented as a head mounted display (HMD). The HMD refers to display techniques by which a display is mounted to a head to show an image directly in front of a user's eyes. In order to provide an image directly in front of the user's eyes if the user wears the glass-type mobile terminal 400, the display unit 451 may be located to correspond to either or both of the left and right eyes. FIG. 4 illustrates that the display unit 451 is located on a portion corresponding to the right eye to output an image viewable by the user's right eye.

The display unit 451 can project an image into the user's eye using a prism. Also, the prism may be formed from optically transparent material such that the user may view both the projected image and a general visual field (a range that the user views through the eyes) in front of the user.

In such a manner, the image output through the display unit 451 can be viewed while overlapping with the general visual field. The mobile terminal 400 can also provide an augmented reality (AR) by overlaying a virtual image on a realistic image or background using the display.

Further, the camera 421 may be located adjacent to either or both of the left and right eyes to capture an image. Since the camera 421 is located adjacent to the eye, the camera 421 can acquire a scene that the user is currently viewing. The camera 421 may be positioned at most any location of the mobile terminal. In some embodiments, multiple cameras 421 may be utilized. Such multiple cameras 421 may be used to acquire a stereoscopic image.

The glass-type mobile terminal 400 may include user input units 423a and 423b, which may each be manipulated by the user to provide an input. The user input units 423a and 423b may employ techniques which permit input via a tactile input. Typical tactile inputs include a touch, push, or the like. The user input units 423a and 423b are shown operable in a pushing manner and a touching manner as they are located on the frame part and the control module 480, respectively.

If desired, mobile terminal 400 may include a microphone which processes input sound into electric audio data, and an audio output module 452 for outputting audio. The audio output module 452 may produce audio in a general audio output manner or an osteoconductive manner. If the audio output module 452 is implemented in the osteoconductive manner, the audio output module 452 may be closely adhered to the head if the user wears the mobile terminal 400 and vibrate the user's skull to transfer sounds.

A communication system which is operable with the variously described mobile terminals will now be described in more detail. Such a communication system may utilize any of a variety of different air interfaces and/or physical layers. Examples of such air interfaces utilized by the communication system include Frequency Division Multiple Access (FDMA), Time Division Multiple Access (TDMA), Code Division Multiple Access (CDMA), Universal Mobile Telecommunications System (UMTS) (including, Long Term Evolution (LTE), LTE-A (Long Term Evolution-Advanced)), Global System for Mobile Communications (GSM), and the like.

By way of a non-limiting example only, further description will relate to a CDMA communication system, but such teachings apply equally to other system types including a CDMA wireless communication system as well as OFDM (Orthogonal Frequency Division Multiplexing) wireless communication system. A CDMA wireless communication system generally includes one or more mobile terminals (MT or User Equipment, UE) 100, one or more base stations (BSs, NodeB, or evolved NodeB), one or more base station controllers (BSCs), and a mobile switching center (MSC). The MSC is configured to interface with a conventional Public Switched Telephone Network (PSTN) and the BSCs. The BSCs are connected to the base stations via backhaul lines. The backhaul lines may be configured in accordance with any of several known interfaces including, for example, E1/T1, ATM, IP, PPP, Frame Relay, HDSL, ADSL, or xDSL. Hence, the plurality of BSCs may be included in the CDMA wireless communication system.

Each base station may include one or more sectors, each sector having an omni-directional antenna or an antenna pointed in a particular direction radially away from the base station. Alternatively, each sector may include two or more different antennas. Each base station may support a plurality of frequency assignments, with each frequency assignment having a particular spectrum (e.g., 1.25 MHz, 5 MHz, etc.).

The intersection of sector and frequency assignment may be referred to as a CDMA channel. The base stations may also be referred to as Base Station Transceiver Subsystems (BTSs). In some cases, the term "base station" may be used to refer collectively to a BSC, and one or more base stations. The base stations may also be denoted as "cell sites." Alternatively, individual sectors of a given base station may be referred to as cell sites.

A broadcasting transmitter (BT) transmits a broadcast signal to the mobile terminals 100 operating within the system. The broadcast receiving module 111 of FIG. 1A is typically configured inside the mobile terminal 100 to receive broadcast signals transmitted by the BT.

Global Positioning System (GPS) satellites for locating the position of the mobile terminal 100, for example, may cooperate with the CDMA wireless communication system. Useful position information may be obtained with greater or fewer satellites than two satellites. It is to be appreciated that other types of position detection technology, (i.e., location technology that may be used in addition to or instead of GPS location technology) may alternatively be implemented. If desired, at least one of the GPS satellites may alternatively or additionally be configured to provide satellite DMB transmissions.

The location information module 115 is generally configured to detect, calculate, or otherwise identify a position of the mobile terminal. As an example, the location information module 115 may include a Global Position System (GPS) module, a Wi-Fi module, or both. If desired, the location information module 115 may alternatively or additionally function with any of the other modules of the wireless communication unit 110 to obtain data related to the position of the mobile terminal.

A typical GPS module 115 may measure an accurate time and distance from three or more satellites, and accurately calculate a current location of the mobile terminal according to trigonometry based on the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites.

Furthermore, the GPS module may acquire speed information in real time to calculate a current position. Sometimes, accuracy of a measured position may be compromised if the mobile terminal is located in a blind spot of satellite signals, such as being located in an indoor space. In order to minimize the effect of such blind spots, an alternative or supplemental location technique, such as Wi-Fi Positioning System (WPS), may be utilized.

The Wi-Fi positioning system (WPS) refers to a location determination technology based on a wireless local area network (WLAN) using Wi-Fi as a technology for tracking the location of the mobile terminal 100. This technology typically includes the use of a Wi-Fi module in the mobile terminal 100 and a wireless access point for communicating with the Wi-Fi module.

The Wi-Fi positioning system may include a Wi-Fi location determination server, a mobile terminal, a wireless access point (AP) connected to the mobile terminal, and a database stored with wireless AP information.

The mobile terminal connected to the wireless AP may transmit a location information request message to the Wi-Fi location determination server. The Wi-Fi location determination server extracts the information of the wireless AP connected to the mobile terminal 100, based on the location information request message (or signal) of the mobile terminal 100. The information of the wireless AP may be transmitted to the Wi-Fi location determination server through the mobile terminal 100, or may be transmitted to the Wi-Fi location determination server from the wireless AP.

The information of the wireless AP extracted based on the location information request message of the mobile terminal 100 may include one or more of media access control (MAC) address, service set identification (SSID), received signal strength indicator (RSSI), reference signal received Power (RSRP), reference signal received quality (RSRQ), channel information, privacy, network type, signal strength, noise strength, and the like.

The Wi-Fi location determination server may receive the information of the wireless AP connected to the mobile terminal 100 as described above, and may extract wireless AP information corresponding to the wireless AP connected to the mobile terminal from the pre-established database. The information of any wireless APs stored in the database may be information such as MAC address, SSID, RSSI, channel information, privacy, network type, latitude and longitude coordinate, building at which the wireless AP is located, floor number, detailed indoor location information (GPS coordinate available), AP owner's address, phone number, and the like. In order to remove wireless APs provided using a mobile AP or an illegal MAC address while a location determining process, the Wi-Fi location determination server may extract only a predetermined number of wireless AP information in order of high RSSI.

Then, the Wi-Fi location determination server may extract (analyze) location information of the mobile terminal 100 using at least one wireless AP information extracted from the database. A method for extracting (analyzing) location information of the mobile terminal 100 may include a Cell-ID method, a fingerprint method, a trigonometry method, a landmark method, and the like.

The Cell-ID method is used to determine a position of a wireless AP having the largest signal strength, among peripheral wireless AP information collected by a mobile terminal, as a position of the mobile terminal. The Cell-ID method is an implementation that is minimally complex, does not require additional costs, and location information may be rapidly acquired. However, in the Cell-ID method, the precision of positioning may fall below a desired threshold if the installation density of wireless APs is low.

The fingerprint method is used to collect signal strength information by selecting a reference position from a service area, and to track a position of a mobile terminal using the signal strength information transmitted from the mobile terminal based on the collected information. In order to use the fingerprint method, it is common for the characteristics of radio signals to be pre-stored in the form of a database.

The trigonometry method is used to calculate a position of a mobile terminal based on a distance between coordinates of at least three wireless APs and the mobile terminal. In order to measure the distance between the mobile terminal and the wireless APs, signal strength may be converted into distance information, Time of Arrival (ToA), Time Difference of Arrival (TDoA), Angle of Arrival (AoA), or the like may be taken for transmitted wireless signals.

The landmark method is used to measure a position of a mobile terminal using a known landmark transmitter. In addition to these position location methods, various algorithms may be used to extract (analyze) location information of a mobile terminal. Such extracted location information may be transmitted to the mobile terminal 100 through the Wi-Fi location determination server, thereby acquiring location information of the mobile terminal 100.

The mobile terminal 100 may acquire location information by being connected to at least one wireless AP. The number of wireless APs required to acquire location information of the mobile terminal 100 may be variously changed according to a wireless communication environment within which the mobile terminal 100 is positioned.

As previously described with regard to FIG. 1A, the mobile terminal may include short-range communication techniques such as Bluetooth™, Radio Frequency Identification (RFID), Infrared Data Association (IrDA), Ultra-Wideband (UWB), ZigBee, Near Field Communication (NFC), Wireless USB (Wireless Universal Serial Bus), and the like.

A typical NFC module provided at the mobile terminal supports short-range wireless communication, which is a non-contactable type of communication between mobile terminals and generally occurs within about 10 cm. The NFC module may operate in one of a card mode, a reader mode, or a P2P mode. The mobile terminal 100 may further include a security module for storing card information, in order to operate the NFC module in a card mode. The security module may be a physical medium such as Universal Integrated Circuit Card (UICC) (e.g., a Subscriber Identification Module (SIM) or Universal SIM (USIM)), a secure micro SD and a sticker, or a logical medium (e.g., embedded Secure Element (SE)) embedded in the mobile terminal. Single Wire Protocol (SWP)-based data exchange may be performed between the NFC module and the security module.

When the NFC module operates in a card mode, the mobile terminal may transmit card information on a general IC card to the outside. More specifically, if a mobile terminal having card information on a payment card (e. g, a credit card or a bus card) approaches a card reader, a short-range mobile payment may be executed. As another example, if a mobile terminal which stores card information on an entrance card approaches an entrance card reader, an entrance approval procedure may start. A card such as a credit card, a traffic card, or an entrance card may be included in the security module in the form of applet, and the security module may store card information on the card mounted therein. Card information for a payment card may include any of a card number, a remaining amount and usage history, and the like. Card information of an entrance card may include any of a user's name, a user's number (e.g., undergraduate number or staff number), an entrance history, and the like.

If the NFC module operates in a reader mode, the mobile terminal may read data from an external tag. The data received from the external tag by the mobile terminal may be coded into the NFC Data Exchange Format defined by the NFC Forum. The NFC Forum generally defines four record types. More specifically, the NFC Forum defines four Record Type Definitions (RTDs) such as smart poster, text, Uniform Resource Identifier (URI), and general control. If the data received from the external tag is a smart poster type, the controller may execute a browser (e.g., Internet browser). If the data received from the external tag is a text type, the controller may execute a text viewer. If the data received from the external tag is a URI type, the controller may execute a browser or originate a call. If the data received from the external tag is a general control type, the controller may execute a proper operation according to control content.

In some cases in which the NFC module operates in a P2P (Peer-to-Peer) mode, the mobile terminal may execute P2P communication with another mobile terminal. In this instance, Logical Link Control Protocol (LLCP) may be applied to the P2P communication. For P2P communication, connection may be generated between the mobile terminal and another mobile terminal. This connection may be categorized as a connectionless mode which ends after one packet is switched, and a connection-oriented mode in which packets are switched consecutively. For a typical P2P communication, data such as an electronic type name card, address information, a digital photo and a URL, a setup parameter for Bluetooth connection, Wi-Fi connection, etc. may be switched. The P2P mode may be effectively utilized in switching data of a small capacity, because an available distance for NFC communication is relatively short.

Further preferred embodiments will be described in more detail with reference to additional drawing figures. It is understood by those skilled in the art that the present features may be embodied in several forms without departing from the characteristics thereof.

Figure 5:
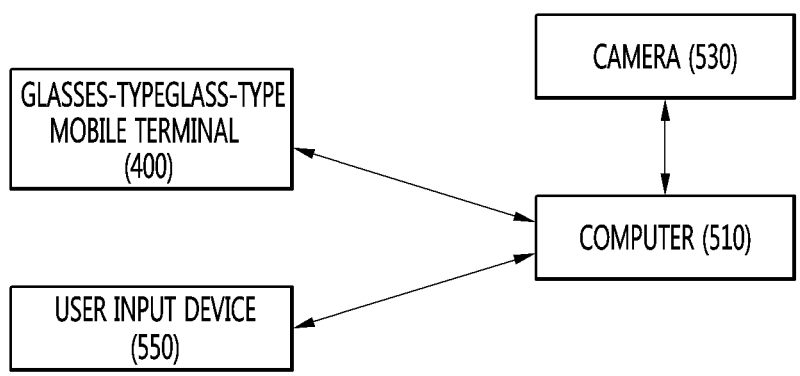
FIG. 5 and FIG. 6 illustrate a configuration of a virtual reality system in accordance with one embodiment of the present disclosure.
Figure 6:
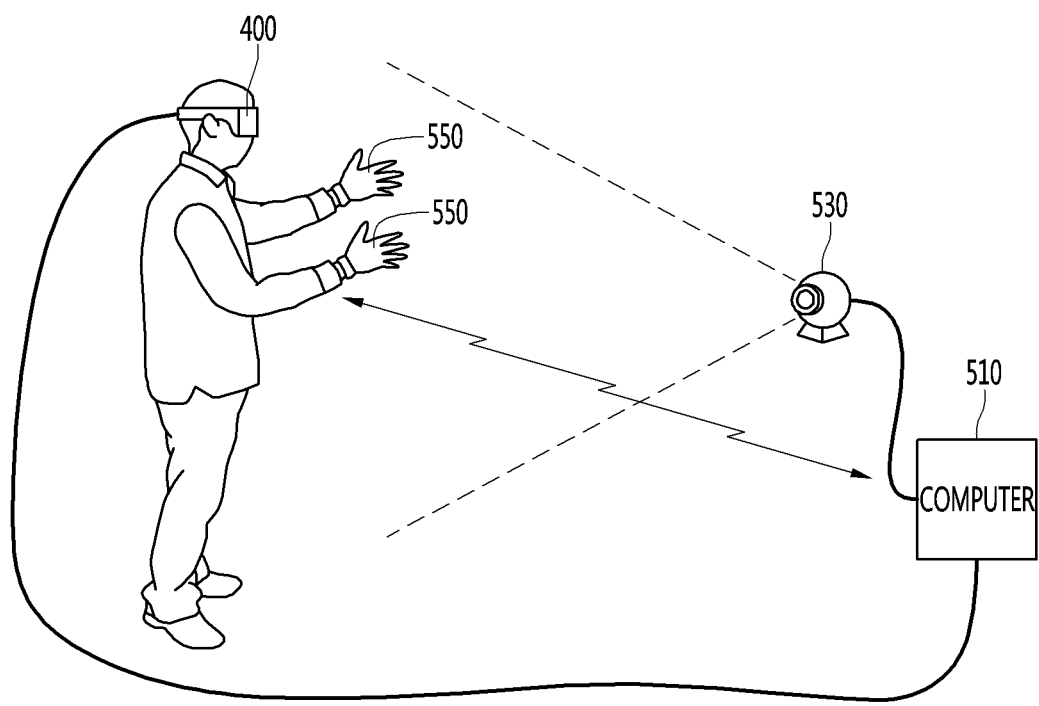

Next, FIG. 5 and FIG. 6 illustrate a configuration of a virtual reality system in accordance with one embodiment of the present disclosure. Referring to FIG. 5 and FIG. 6, a virtual reality system 500 includes a glass-type mobile terminal 400, a computer 510, a user input device 550 and a camera 530.

The glass-type mobile terminal 400 may be head-mounted. The glass-type mobile terminal 400 may play a virtual reality video on a display unit thereof. The virtual reality image or video may be provided from the computer 510, or may be provided from a further mobile terminal connected to the glass-type mobile terminal 400.

The glass-type mobile terminal 400 may have a configuration as shown in FIG. 4 and include the components of the mobile terminal as shown in FIG. 1. Further, the computer 510 controls operations of the user input device 550 and glass-type mobile terminal 400, and can communicate with the user input device 550 in a wired or wireless manner.

The computer 510 can also control the glass-type mobile terminal 400 to allow a virtual input image corresponding to an input from the user input device 550 to be reflected in the virtual reality image. The virtual input image can also move or vary based on an input of the user input device 550. For example, the virtual input image may vary depending on a movement of the user input device 550.

In addition, the user input device 550 can manipulate the virtual reality image via the virtual input image. The user input device 550 may be worn on a hand, arm, foot, etc. or may be gripped by the hand. Further, the camera 530 can obtain an image of the user in front thereof, and the obtained image can be sent to the computer 510.

Figure 7:
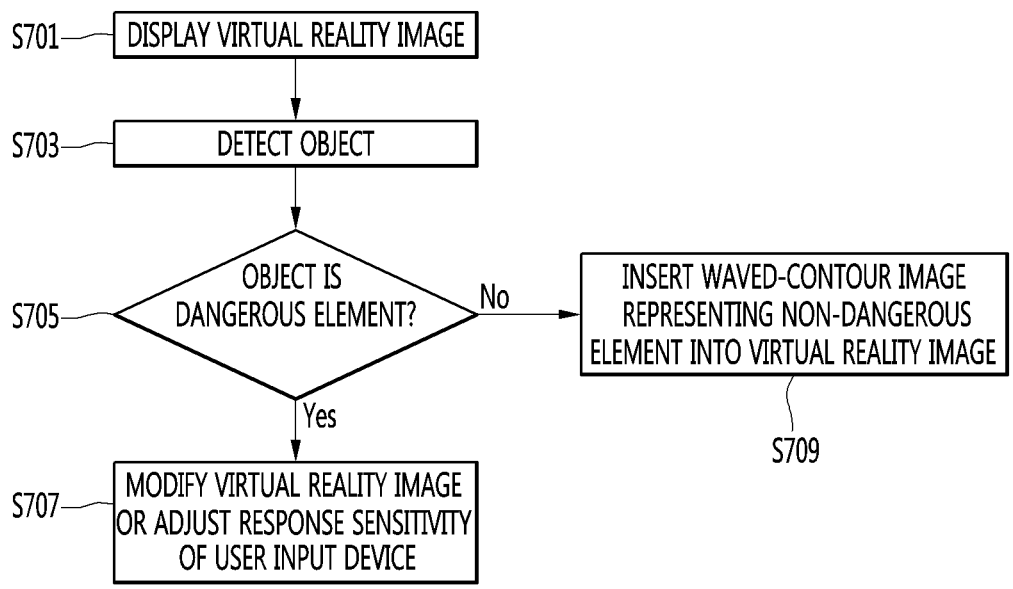
FIG. 7 is a flow chart illustrating a method for operating a glass-type mobile terminal in accordance with one embodiment of the present disclosure.

Next, FIG. 7 shows a flow chart of a method for operating a glass-type mobile terminal in accordance with one embodiment of the present disclosure. Hereinafter, the method for operating a glass-type mobile terminal will be described with reference to FIG. 7 together with FIG. 1A and FIG. 4 illustrating the glass-type mobile terminal 400.

Referring to FIG. 7, the control module 480 of the glass-type mobile terminal 400 displays a virtual reality image on the display unit 451 (S701). In one embodiment, the virtual reality image may be a content stored in the glass-type mobile terminal 400. In another embodiment, the virtual reality image may be provided from another mobile terminal connected to the glass-type mobile terminal 400. In still another embodiment, the virtual reality image may be provided from the computer 510 communicating with the glass-type mobile terminal 400 in a wireless or wired manner.

Further, the control module 480 controls the camera 421 to detect an object around the glass-type mobile terminal 400 while the virtual reality image is displayed (S703). In one embodiment, the glass-type mobile terminal 400 has the camera 421 mounted thereon to detect the object around the glass-type mobile terminal 400.

In particular, the camera 421 can obtain an image of an environment around the glass-type mobile terminal 400 while the virtual reality image is displayed. Further, the control module 480 can determine whether there is any object around the glass-type mobile terminal 400 based on an analysis of the imaged environment. For example, the object may interfere with a movement of the user while he or she is viewing the virtual reality image. Examples of the object include a wall, desk, door, etc.

In another embodiment, the control module 480 controls a proximity sensor mounted on the glass-type mobile terminal 400 to detect the object around the terminal 400. In still another embodiment, the control module 480 controls a distance sensor mounted on the glass-type mobile terminal 400 to detect the object around the terminal 400.

In yet another embodiment, the control module 480 controls at least one of the camera 421, proximity sensor, distance sensor, etc. mounted on the glass-type mobile terminal 400 to detect the object around the terminal 400. In another embodiment, the control module 480 controls an infrared sensor mounted on the glass-type mobile terminal 400 to detect the object around the terminal 400.

In addition, the control module 480 determines whether the detected object is a dangerous element (S705). In one embodiment, the control module 480 can determine whether the detected object is a dangerous element (S705) based on a distance between the detected object and the glass-type mobile terminal 400.

For example, if the distance between the detected object and the glass-type mobile terminal 400 measured using the proximity sensor or distance sensor is within a predetermined distance, the control module 480 can determine that the detected object is a dangerous element. On the contrary, if the distance between the detected object and glass-type mobile terminal 400 is larger than or equal to the predetermined distance, the control module 480 can determine that the detected object is a non-dangerous element.

In another embodiment, the control module 480 can determine whether the detected object is a dangerous element based on a distance between the detected object and the user input device 550. In this instance, the user input device 550 may have the proximity sensor or distance sensor mounted thereon.

Further, the user input device 550 can transmit the distance between the object and user input device 550 measured using the proximity sensor or distance sensor to the control module 480 of the glass-type mobile terminal 500. The control module 480 can then determine whether the detected object is a dangerous element based on the received distance.

If the distance between the detected object and the user input device 550 is within a predetermined distance, the control module 480 can determine that the detected object is a dangerous element. On the contrary, if the distance between the detected object and user input device 550 is larger than or equal to the second predetermined distance, the control module 480 can determine that the detected object is a non-dangerous element.

Upon determination that the detected object is a dangerous element (Yes in S705), the control module 480 can modify the virtual reality image or adjust a response sensitivity of the user input device 550 (S707). In one embodiment, upon determination that the detected object is a dangerous element, the control module 480 can insert a virtual obstacle image corresponding to the detected object into the virtual reality image.

In another embodiment, upon determination that the detected object is a dangerous element, the control module 480 can convert a portion of the virtual reality image to the virtual obstacle image corresponding to the detected object. In another embodiment, upon determination that the detected object is a dangerous element, the control module 480 can change an orientation of the virtual reality image. To be specific, if the dangerous object is determined to be a real wall, the control module 480 can change an orientation of the virtual reality image to guide the user toward an open wide space.

In another embodiment, upon determination that the detected object is a dangerous element, the control module 480 can increase or decrease the response sensitivity of the user input device 550. For example, the response sensitivity represents a response degree of a virtual input image corresponding to the user input device 550. The virtual input image may be an arm of the user.

In another embodiment, upon determination that the detected object is a dangerous element, the control module 480 can modify the virtual reality image and adjust the response sensitivity of the user input device 550. The control module 480 can also display an alarm message on the display unit 451 to indicate that the dangerous object is near to the user.

Figure 9:
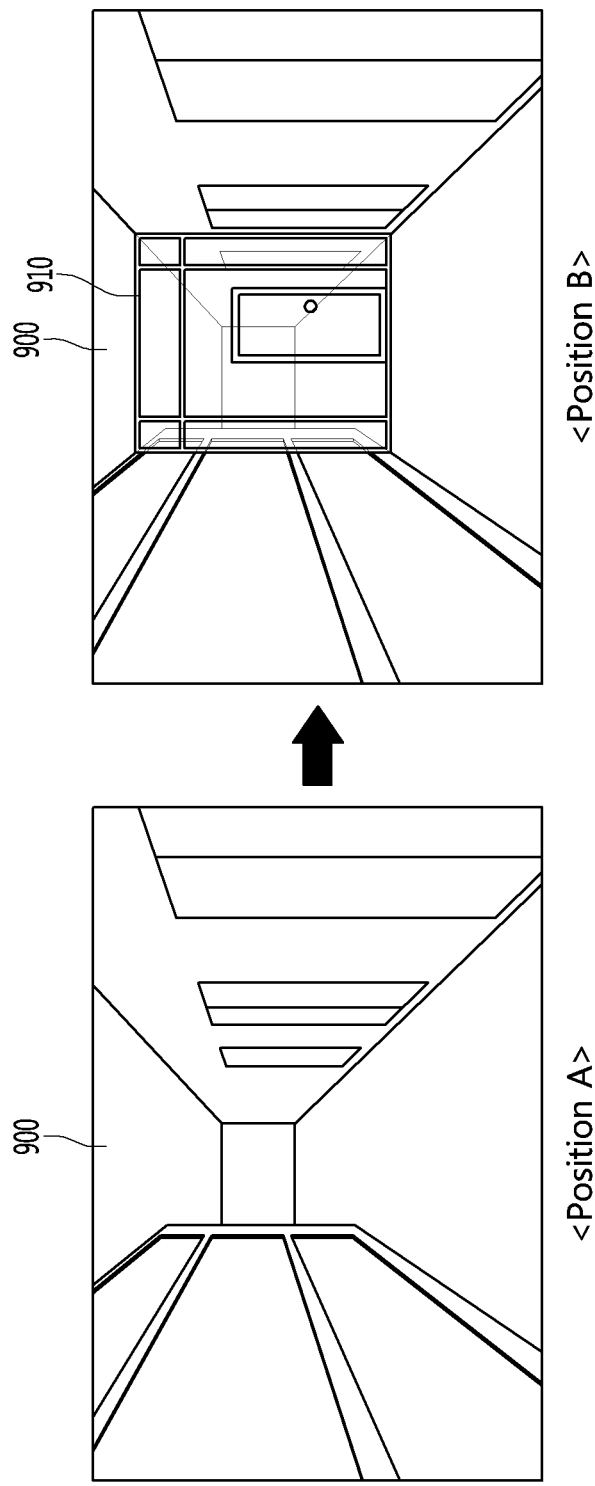
Figure 10:
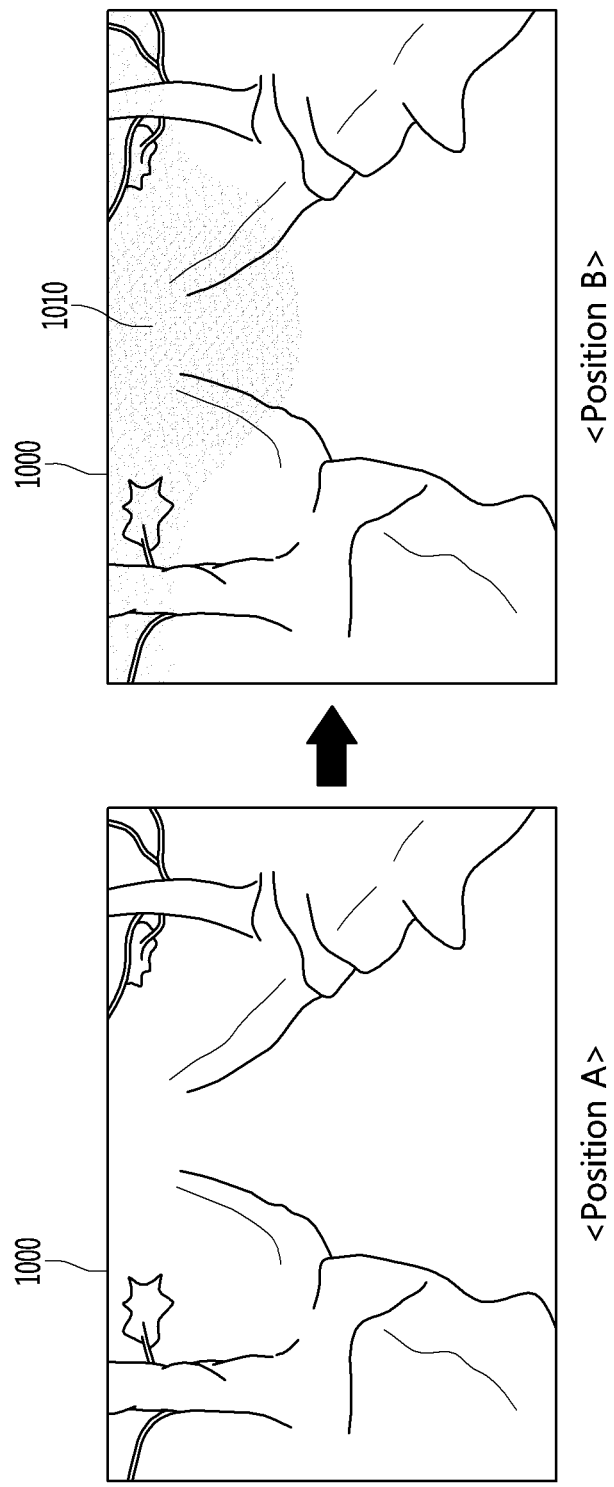

Hereinafter, step S707 will be described in detail below. In particular, FIG. 8 to FIG. 10 show an example where the virtual reality image is changed upon occurrence of the dangerous object while the user views the virtual reality image.

Figure 8:
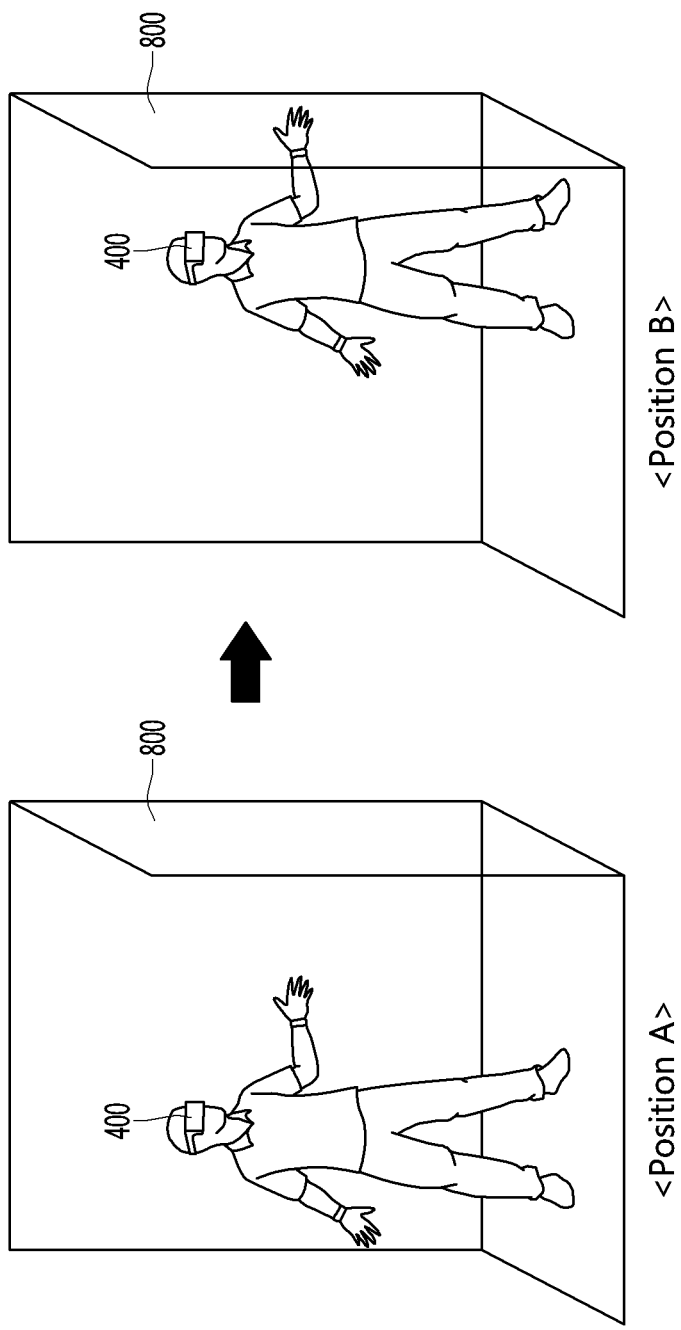
FIG. 8 to FIG. 10 show an example where the virtual reality image is changed upon occurrence of the dangerous object while the user views the virtual reality image.

Referring to FIG. 8, a real environment is shown where the virtual reality image is viewed via the glass-type mobile terminal 400 by the user. The user is present at a position A, in which the display unit 451 of the glass-type mobile terminal 400 displays the virtual reality image 900 thereon. As shown in FIG. 9, if the user is present at the A position, the virtual reality image 900 displayed on the glass-type mobile terminal 400 may be a front open corridor image.

If the user moves from the position A to a position B, the user may risk colliding with a wall 800 proximate to the user. In this instance, the control module 480 can determine that the wall 800 proximate to the glass-type mobile terminal 400 is dangerous. Then, as shown in FIG. 9, the control module 480 can insert a virtual obstacle image 910 corresponding to the wall 800 in an existing the virtual reality image 900. That is, the virtual obstacle image 910 can be inserted into the front open corridor image. For example, a transparent wall image may be inserted into the corridor image.

In addition, the control module 480 can acquire a distance between the glass-type mobile terminal 400 and real wall 800 using the proximity sensor or distance sensor. As discussed above, the control module 480 can determine that the real wall 800 is a dangerous element if the distance is within a predetermined distance.

In another embodiment, the control module 480 can acquire a distance between the user input device 550 and the real wall 800. The control module 480 can acquire the distance between the user input device 550 and the real wall 800 using the proximity sensor or distance sensor mounted on the user input device 550. The present disclosure is not limited thereto.

Further, the control module 480 can acquire the distance between the user input device 550 and the real wall 800 from the computer 510. That is, the user input device 550 can measure a distance between the user input device 550 and the real wall 800 therefrom and then transmit the measured distance to computer 510, which in turn can transmit the distance to the control module 480.

The control module 480 can also determine that the real wall 800 is dangerous if the distance between the user input device 550 and real wall 800 is within the second predetermined distance. The user may perceive the transparent wall via the glass-type mobile terminal 400 while the user moves from the A position to the B position. Thus, upon this perception, the user can stop there. In this way, the user can be prevented from colliding with the real wall 800.

Referring to FIG. 10, a further real environment is shown where the virtual reality image is viewed via the glass-type mobile terminal 400 by the user. If the user is present at an A position, the display unit 451 can display the virtual reality image corresponding to a front open road image 1000. If the user moves from the A position to a B position, the control module 480 can perceive that the user of the glass-type mobile terminal 400 is closer to the real wall 800.

The control module 480 can insert a foggy image 1010 corresponding to the real wall 800 into the existing road image 1000 at a front thereof. The foggy image 1010 may also be the virtual reality image. Thus, if the user is present at the B position, the user can perceive the foggy image 1010 on the display unit 451 and thus avoid colliding with the real wall 800.

In another embodiment, while the user views the virtual reality image, and if the dangerous object is detected, the control module 480 can change a position of a portion of the virtual reality image or adjust the response sensitivity of the user input device 550.

Figure 11:
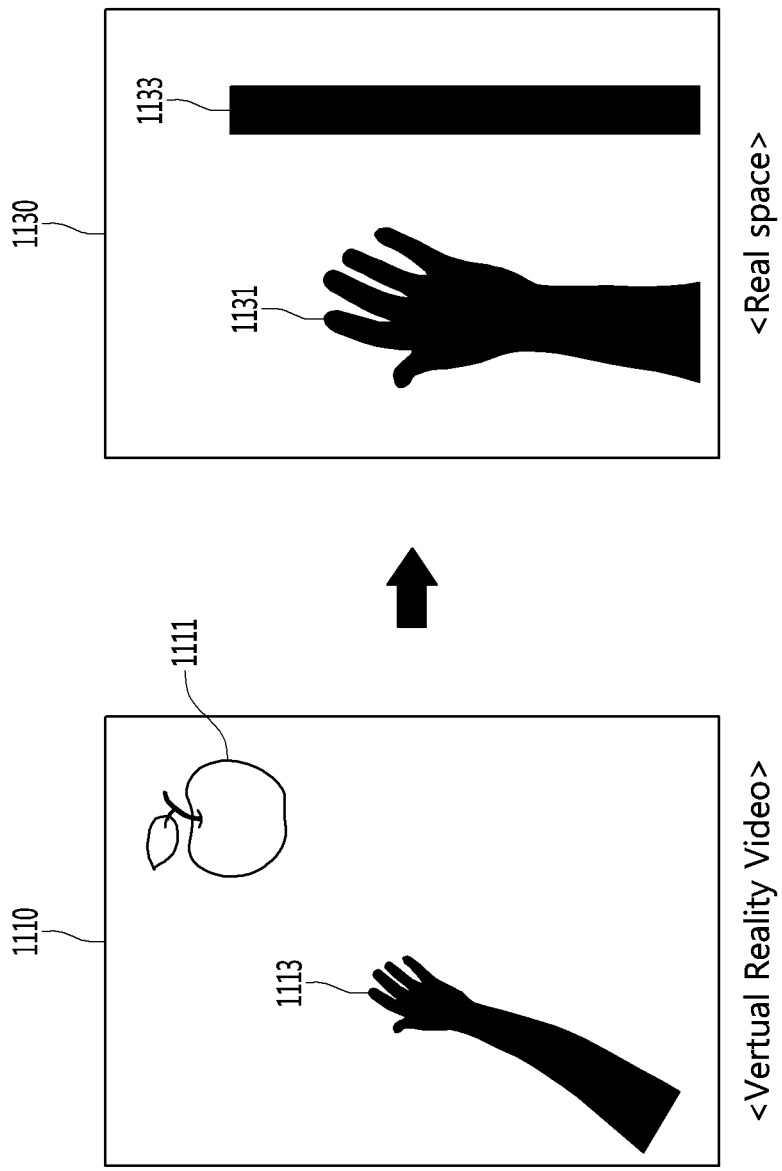
FIG. 11 to FIG. 13 show another example where, while the user views the virtual reality image, and if the dangerous object is detected, the control module changes a position of a portion of the virtual reality image or adjust the response sensitivity of the virtual input image to an input from the user input device.
Figure 12:
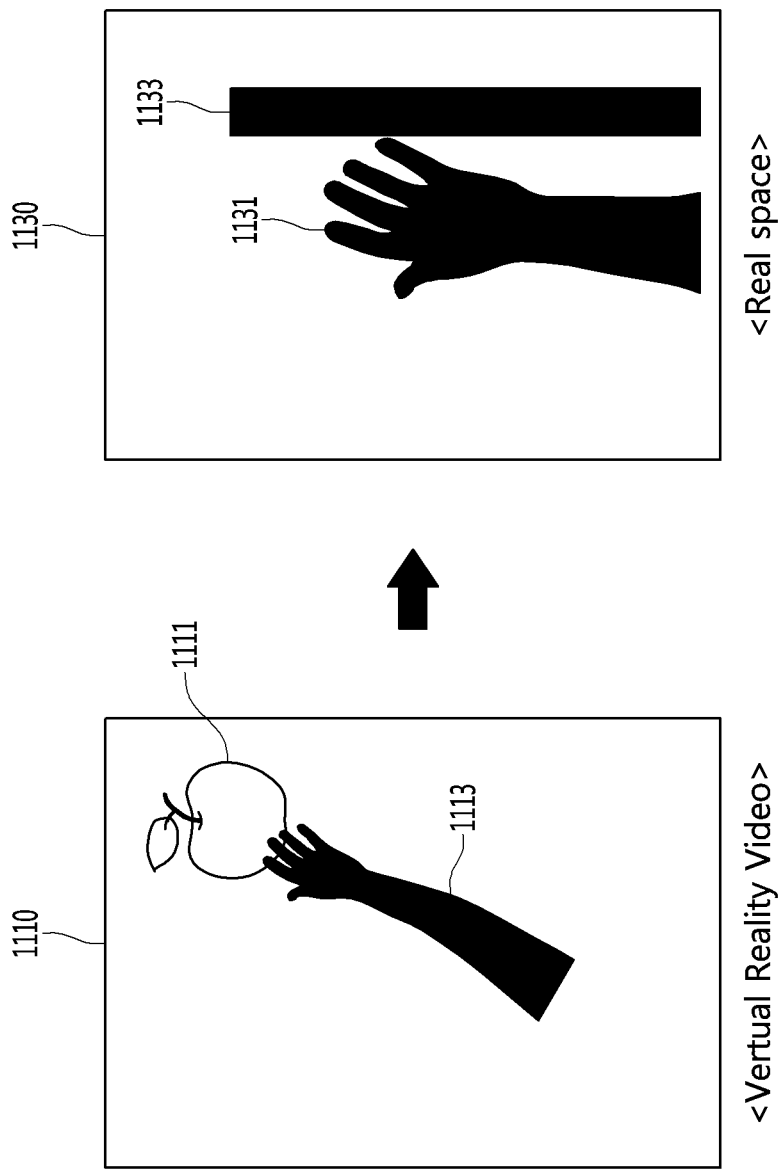
Figure 13:
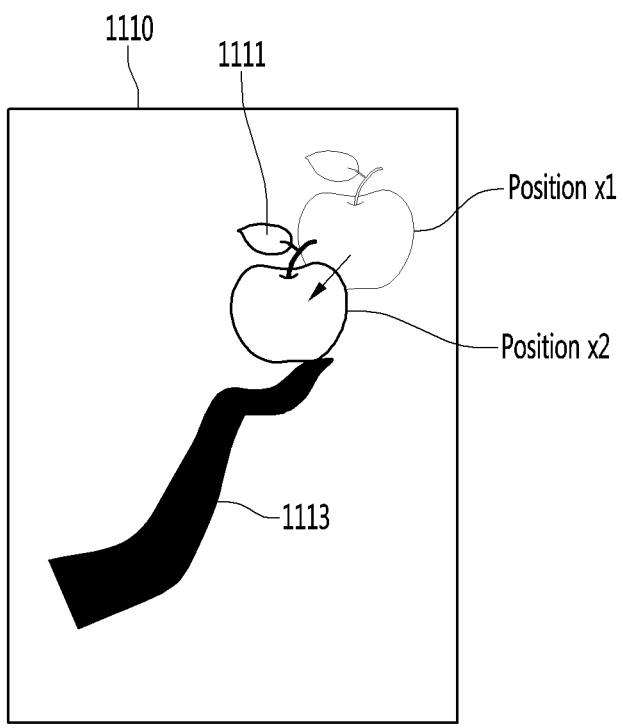

In particular, FIG. 11 to FIG. 13 show another example where, while the user views the virtual reality image, and if the dangerous object is detected, the control module 480 changes a position of a portion of the virtual reality image or adjusts the response sensitivity of the user input device.

Referring to FIG. 11 to FIG. 13, the user is assumed to have the user input device 550 on his/her hand as shown in FIG. 5. Referring to FIG. 11, the user's real environment 1130 is shown where the virtual reality image 1110 is viewed on the display unit 451 of the glass-type mobile terminal 400 by the user.

The virtual reality image 1110 may include a virtual hand image 1113 corresponding to a movement of the user's hand and a virtual apple image 1111. In the real environment 1130, the user's real hand 1131 and a real wall 1133 are present.

FIG. 12 shows a situation where the user intends to reach the virtual apple image 1111 via the virtual hand image 1113 in the virtual reality image 1110. In this instance, if the user's real hand 1131 is closer to the real wall 1133, the control module 480 can determine that the real wall 1133 is a dangerous element. That is, the control module 480 can determine that the real wall 1133 is a dangerous element if the distance between the user's real hand 1131 and real wall 1133 is within a predetermined distance.

Thus, as shown in FIG. 13, upon determination that the real wall 1133 is dangerous, the control module 480 can displace the virtual apple image 1111 toward the user's virtual hand image 1113. That is, if the user intends to reach the virtual apple image 1111 in the virtual reality image 1110, the user's real hand 1131 may collide with the real wall 1133. In order to prevent this, the control module 480 can move the position of virtual apple image 1111 toward the virtual hand image 1113 in the virtual reality image 1100.

In another embodiment, upon determination that the object is dangerous, the control module 480 can increase the response sensitivity of the user input device 550. The response sensitivity of the user input device 550 may indicate a degree at which the virtual reality image varies in a response to the movement of the input device 550.

In more detail, the response sensitivity of the user input device 550 can indicate a movement speed of the user's virtual hand in the virtual reality image in a response to the movement of the user input device 550. In this instance, as the response sensitivity of the user input device 550 is higher, the small movement of the user's real hand leads to a large movement of the user's virtual hand in the virtual reality image. On the contrary, as the response sensitivity of the user input device 550 is lower, the large movement of the user's real hand leads to a small movement of the user's virtual hand in the virtual reality image.

In FIG. 12, upon determination that the real wall 1133 is dangerous, the control module 480 can increase the response sensitivity of user input device 550. Thus, as the user moves his/her real hand 1131 at a small extent, the virtual hand image 1113 moves at a large extent. Thus, the user may easily reach the virtual apple image 1111. Further, as the response sensitivity of the virtual input image to an input from the user input device 550 increases, it is less probable that the user's real hand 1131 collides with the real wall 1133.

In another embodiment, upon determination that the real wall 1133 is a dangerous element, the control module 480 can move the position of the virtual apple image 1111 toward the virtual hand image 1113, and to increase the response sensitivity of the virtual input image to an input from the user input device 550. In another embodiment, upon determination that the object is a dangerous element, the control module 480 can project a real image of the object onto the virtual reality image.

Figure 14:
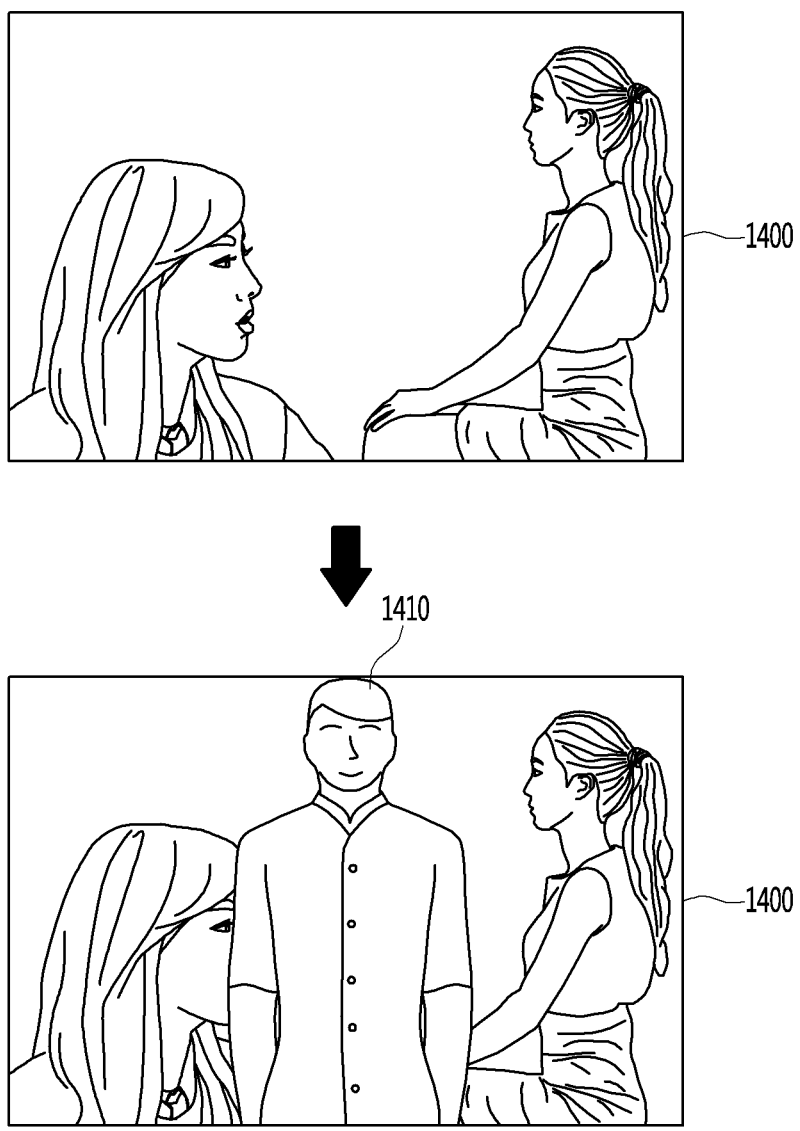
FIG. 14 shows another example where, upon determination that the object is dangerous, the control module projects a real image of the object onto the virtual reality image.

FIG. 14 shows another example where, upon determination that the object is a dangerous element, the control module projects a real image of the object onto the virtual reality image. In FIG. 14, a virtual gaming image 1400 as the virtual reality image is displayed on the display unit 451 of the glass-type mobile terminal 400. One example of a virtual gaming is a boxing gaming.

In this instance, upon determination that the detected object around the glass-type mobile terminal 400 is a dangerous element, the control module 480 can project a real image 1410 of the object on the virtual gaming image 1400. The real image 1410 of the object may be obtained using the camera 421 mounted on the glass-type mobile terminal 400.

In addition, the image projected on the virtual gaming image 1400 may at least partially correspond to the entire image of the object. Thus, the user can perceive the real image 1410 of the object determined to be dangerous while viewing the virtual gaming image 1400, and thus easily realize that a risky situation occurs.

In another embodiment, upon determination that the object is a dangerous element, the control module 480 can stop playing the virtual gaming image or video 1400. In another embodiment, upon determination that the object is a dangerous element, the control module 480 can turn off the power to the display unit 451.

Thus, while viewing the virtual reality image, and if the risky situation occurs due to the adjacent object, the user's action may be easily triggered to avoid such a situation. A reference will be made again to FIG. 7.

Upon determination that the detected object is non-dangerous (No in S705), the control module 480 can insert a waved-contour image onto the virtual reality image to indicate that the object is a non-dangerous element (S709). In one embodiment, while viewing the virtual reality image, and if the detected object is a non-dangerous element, the control module 480 can insert a waved-contour image corresponding to the detected object into the virtual reality image.

That is, upon determination that the object is a non-dangerous element, the control module 480 can display a virtual object image corresponding to the non-dangerous element to be different from the virtual object image corresponding to the dangerous element in the virtual reality image.

Figure 15:
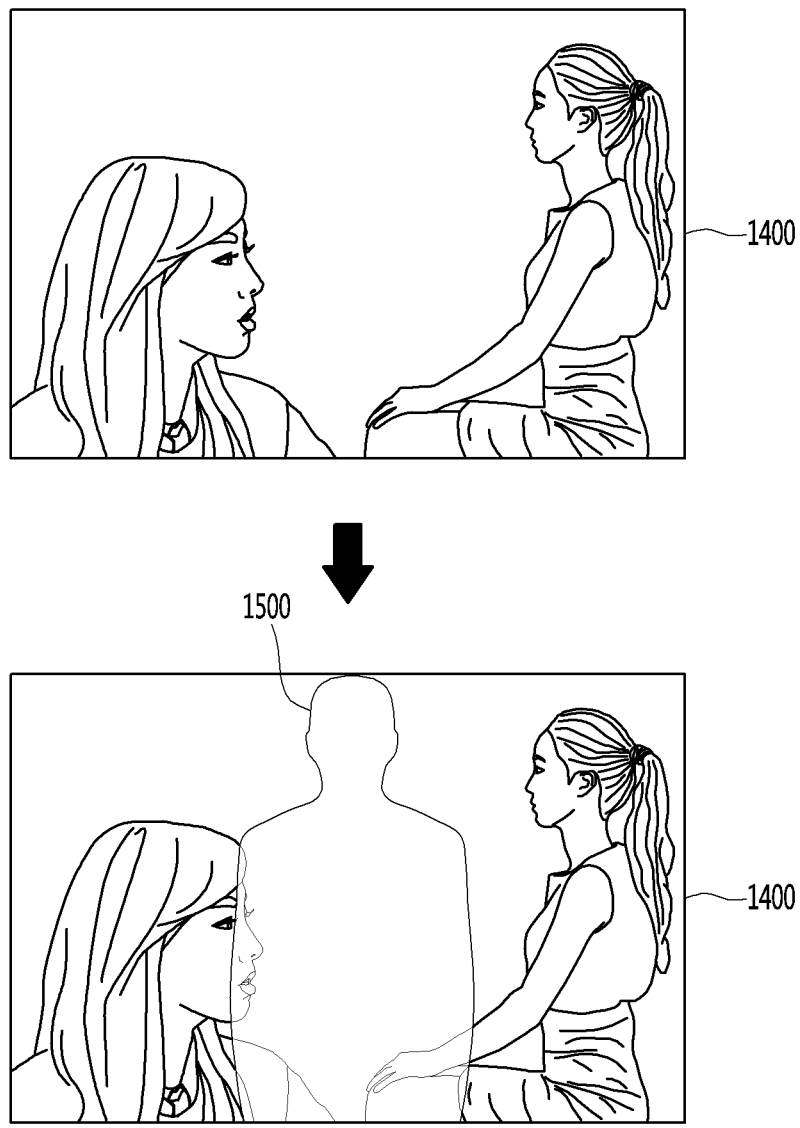
FIG. 15 shows another example where, upon determination that the detected object is non-dangerous, the control module overlaps a waved-contour image onto the virtual reality image to indicate that the object is non-dangerous.

Hereinafter, the S709 will be described with reference to FIG. 15. FIG. 15 shows another example where, upon determination that the detected object is a non-dangerous element, the control module 480 overlaps a waved-contour image onto the virtual reality image to indicate that the object is non-dangerous.

In FIG. 15, the virtual gaming image 1400 as the virtual reality image is displayed on the display unit 451 of the glass-type mobile terminal 400. The virtual gaming may be a boxing gaming. In this instance, the control module 480 controls the sensor to detect an object in front of the glass-type mobile terminal 400. Upon determination that the detected object is a non-dangerous element, the control module 480 can overlap a waved-contour image 1500 corresponding to the object onto the virtual gaming image 1400.

For example, if the detected object is a human being, a transparent waved-contour image corresponding to her/his outer contour can be inserted into the virtual gaming image 1400. While the user views the virtual gaming image 1400, the user may perceive that a human being passes in front of the user outside of the virtual gaming image. This is because while the user executes the virtual gaming, it may be difficult to dynamically view a map of the virtual gaming.

In accordance with one embodiment, the response sensitivity of the user input device 550 can be adjusted based on the user's activity real environment in which the user views the virtual reality image, and the user's physical condition.

Figure 16:
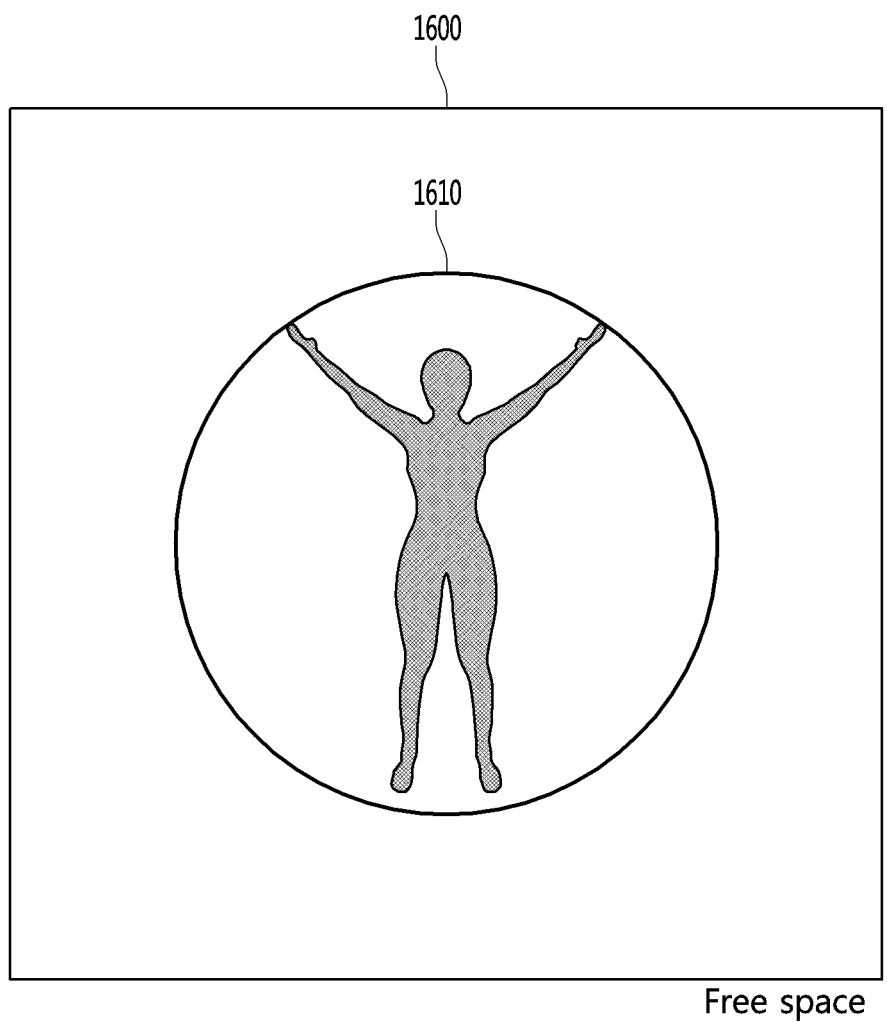
FIG. 16 and FIG. 17 show another example where the response sensitivity of the virtual input image to an input from the user input device is adjusted based on the user's activity real environment in which the user views the virtual reality image, and the user's physical condition or the user's input area.
Figure 17:
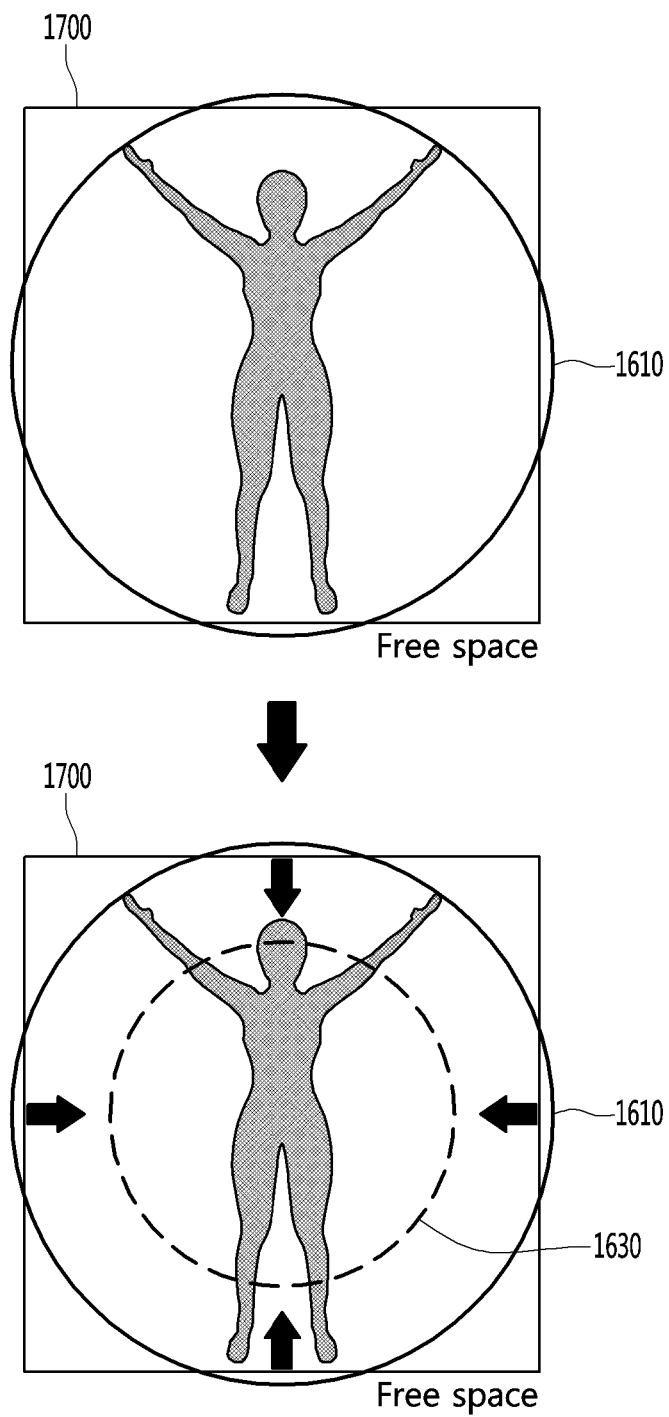

Next, FIG. 16 and FIG. 17 shows another example where the response sensitivity of the user input device is adjusted based on the user's activity real environment in which the user views the virtual reality image, and the user's physical condition or the user's input area.

Hereinafter, the user's activity real environment is defined as a minimum environment space required to view the virtual reality image via the glass-type mobile terminal 400. The user's input area may be based on a distance between left and right distal ends of both fully stretched arms. This will be described later.

If the user views the virtual reality image on the glass-type mobile terminal 400, the user's sight of a view may be interrupted. Thus, the user' safety should be taken into account depending on an outside condition, especially if the real wall is closer to the user.

In FIG. 16 and FIG. 17, the user is assumed to have the user input device 550 on his/her hand. Referring to FIG. 16, the user's activity real environment 1600 is shown. In one embodiment, the user's activity real environment 1600 can be acquired using the camera 530 outside thereof as shown in FIG. 6. The camera 530 may face and image the user's position in the user's activity real environment and then transmit the imaged user's activity real environment including the user to the computer 510.

The computer 510 can determine a dimension of the user's activity real environment based on the received image. For example, the computer 510 can determine the dimension of the user activity real environment based on the received image and a type of the virtual reality image to be played or displayed on the glass-type mobile terminal 400. For example, if the virtual gaming image is displayed, the dimension of the user activity real environment can be defined as a minimum size of the activity real environment required to view the virtual gaming image.

The computer 510 can acquire information about a dimension of the user's activity real environment based on the minimum size of the activity real environment required to view the virtual gaming image. Then, the computer 510 can transmit the acquired information to the glass-type mobile terminal 400.

In another embodiment, information about a dimension of the user's activity real environment 1600 may be acquired based on a distance between the glass-type mobile terminal 400 and user input device 550. The glass-type mobile terminal 400 can measure the distance to the user input device 550 therefrom and acquire information about a dimension of the user's activity real environment 1600 based on the measured distance. The distance between the glass-type mobile terminal 400 and user input device 550 can be measured using an infrared sensor, proximity sensor and/or distance sensor mounted on the glass-type mobile terminal 400.

If the information about the dimension of the user's activity real environment 1600 is acquired, the response sensitivity of the user input device 550 can be adjusted on the information about the size of the activity real environment and the user input area size.

Further, the user input area 1610 can be configured as a spherical area defined by the left and right distal ends of both fully stretched arms of the user, as shown in FIG. 16. That is, the user input area 1610 can be defined as a minimum area required to allow the user input device 550 to function fully.

If the dimension of the user's activity real environment 1600 is larger than the dimension of the user input area 1610, the control module 480 or computer 510 can increase the response sensitivity of the user input device 550.

On the contrary, as shown in FIG. 17, if the dimension of the user's activity real environment 1600 is smaller than the dimension of the user input area 1610, the control module 480 or computer 510 can decrease the response sensitivity of the user input device 550. As the response sensitivity of the user input device 550 decrease, the dimension of the user input area 1630 is reduced correspondingly.

In another embodiment of the present disclosure, upon determination that the detected object is dangerous, the response sensitivity of the user input device 550 can be adjusted based on the user's activity real environment and object. In particular, FIG. 18 show another example where, upon determination that the detected object is dangerous, the response sensitivity of the user input device is adjusted based on the user's activity real environment and object.

Figure 18:
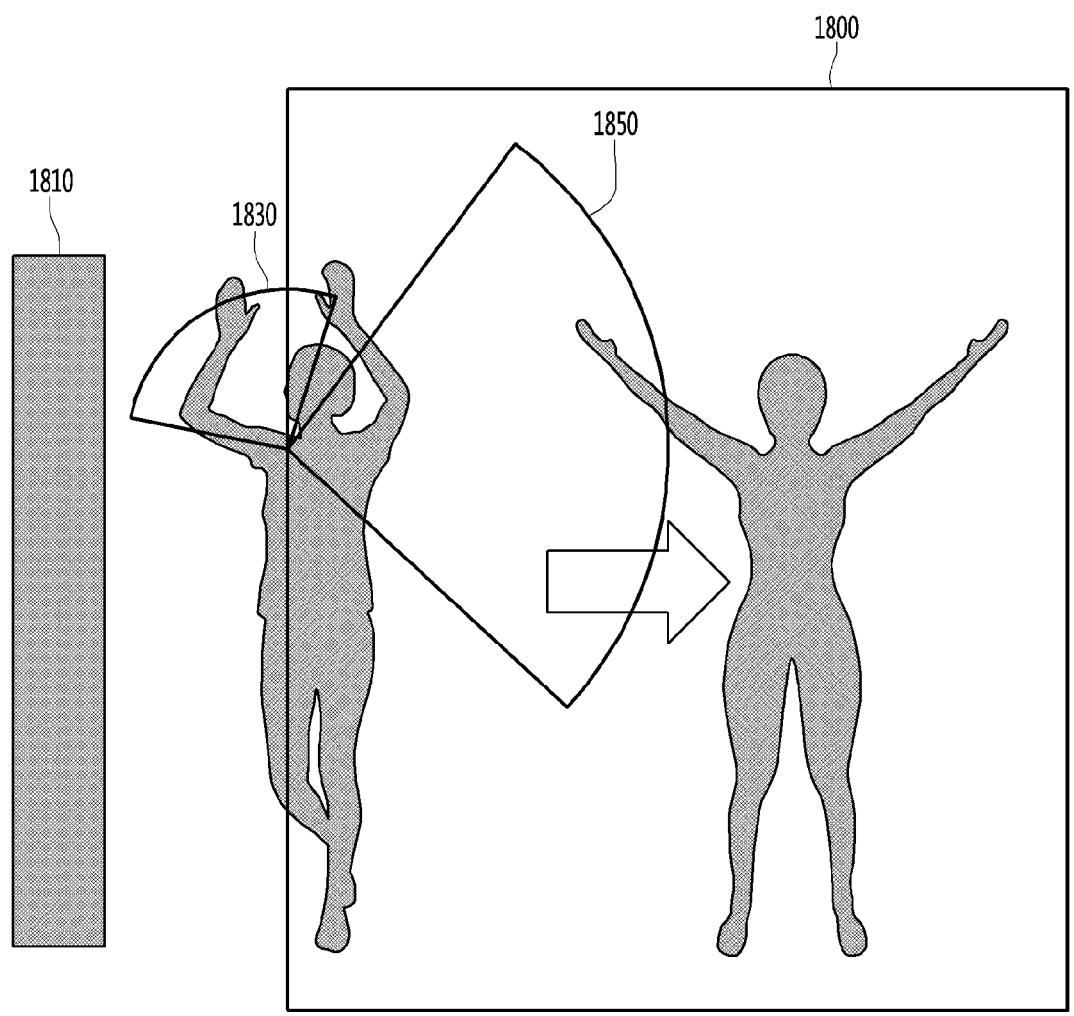
FIG. 18 show another example where, upon determination that the detected object is dangerous, the response sensitivity of the virtual input image to an input from the user input device is adjusted based on the user's activity real environment and object.

In FIG. 18, the user is assumed to have the glass-type mobile terminal 400 and user input device 550 on his/her body. Further, the user's activity real environment 1800 may be configured as shown in FIG. 18. Referring to FIG. 18, if the user is adjacent to a real wall 1810, the glass-type mobile terminal 400 can determine that the real wall 1810 is a dangerous element.

Thus, the glass-type mobile terminal 400 can increase the response sensitivity of the user input device 550 in a first region adjacent to the real wall 1810, whereas, to decrease the response sensitivity of the user input device 550 in a second region opposite the real wall 1810 in the activity real environment 1800. That is, in the first region, the response sensitivity of the user input device 550 may correspond to a first input area 1830, while, in the second region, the response sensitivity of the virtual input image to an input from the user input device 550 may correspond to a second input area 1850.

That is, the response sensitivity of the virtual input image to an input from the user input device may be higher in the region adjacent to the object to be determined to be dangerous, such that only a small movement of the user may suffice. Further, the response sensitivity of the user input device 550 may be lower in the region in the activity real environment and opposite or facing away the object, such that a large movement of the user may be triggered.

In addition, the asymmetrical adjustment of the response sensitivity of the user input device 550 allows the user to further move away from the object. In another embodiment of the present disclosure, the response sensitivity of the user input device 550 can vary based on the body size of the user.

That is, between the users, the body sizes, for example, lengths of arms may vary. Thus, before the virtual reality image is displayed, a predetermined setting about the response sensitivity of the user input device allows the response sensitivity of the user input device 550 to be set based on the body size of the user of interest.

In another embodiment, the control module 480 can automatically adjust the response sensitivity of the user input device 550 based on the body size of the user of interest. For example, the control module 480 can increase the response sensitivity of the user input device 550 if the user as a child has a shorter arm. On the contrary, the control module 480 can decrease the response sensitivity of the user input device 550 if the user as an adult has a longer arm.

A non-transitory computer readable storage medium having stored thereon computer program instructions which performs the method according to exemplary embodiments may be provided. The non-transitory computer readable storage medium refers to a medium where data may be stored semi-permanently and is readable by a device, and not a medium which stores data for a short period of time such as a register, cache, and memory etc. More specifically, the aforementioned various applications or programs may be stored in and provided by non-transitory computer readable medium such as a CD, DVD, hard disk, blue ray disk, USB, memory card, and ROM etc.

In one or more exemplary embodiments, the methods may be recorded, stored, or fixed in one or more non-transitory computer-readable media (computer readable storage (recording) media) that includes program instructions (computer readable instructions) to be implemented by a computer to cause one or more processors to execute (perform or implement) the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions may be executed by one or more processors. The described hardware devices may act as one or more software modules that are recorded, stored, or fixed in one or more non-transitory computer-readable media, in order to perform the operations and methods described above, or vice versa. In addition, a non-transitory computer-readable medium may be distributed among computer systems connected through a network and program instructions may be stored and executed in a decentralized manner. In addition, the computer-readable media may also be embodied in at least one application specific integrated circuit (ASIC) or Field Programmable Gate Array (FPGA).

Although a few exemplary embodiments have been shown and described, it would be appreciated by those skilled in the art that changes may be made in these exemplary embodiments without departing from the principles and spirit of the disclosure, the scope of which is defined in the claims and their equivalents.

What is claimed is:

1. A glass-type mobile terminal comprising:
   a camera;
   a display configured to display a virtual reality image thereon; and
   a controller configured to:
   detect an object around the glass-type mobile terminal while the virtual reality image is displayed on the display,
   compare a size of a user's real activity area captured by the camera with a size of a user input area representing a minimum area required to allow a user input device to function,
   increase a response sensitivity of the user input device when the size of the user's real activity area is larger than the size of the user input area, and
   decrease the response sensitivity of the user input device when the size of the user's real activity area is smaller than the size of the user input area.

2. The terminal of claim 1, wherein the controller is further configured to insert a virtual object image corresponding to the detected object into the virtual reality image.

3. The terminal of claim 2, wherein the controller is further configured to display the virtual object image corresponding to a non-dangerous element to be different from the virtual object image corresponding to a dangerous element in the virtual reality image.

4. The terminal of claim 3, wherein the virtual object image comprises a transparent waved-contour image corresponding to the non-dangerous element.

5. The terminal of claim 2, wherein if the detected object is a real wall, the controller is further configured to modify the virtual reality image by inserting a virtual wall image corresponding to the real wall into the virtual reality image.

6. The terminal of claim 1, wherein the controller is further configured to modify the virtual reality image by changing an orientation of the virtual reality image.

7. The terminal of claim 1, wherein the controller is further configured to modify the virtual reality image by displacing a portion of the virtual reality image corresponding to a position of the detected object within the virtual reality image.

8. The terminal of claim 1, wherein the controller is further configured to automatically adjust the response sensitivity of the user input device based on a body size of the user, wherein the user is wearing the glass-type mobile terminal.

9. The terminal of claim 1, further comprising:
a distance sensor configured to measure a distance between the glass-type mobile terminal and the detected object,
wherein the controller is further configured to determine whether or not the detected object is a dangerous element based on the measured distance.

10. A method of controlling a glass-type mobile terminal, the method comprising:
displaying, via a display of the glass-type mobile terminal, a virtual reality image thereon;
detecting, via a controller of the glass-type mobile terminal, an object around the glass-type mobile terminal while the virtual reality image is displayed on the display;
comparing a size of a user's real activity area captured by the camera with a size of a user input area representing a minimum area required to allow the user input device to function;
increasing the response sensitivity of the user input device when the size of the user's real activity area is larger than the size of the user input area; and
decreasing the response sensitivity of the user input device when the size of the user's real activity area is smaller than the size of the user input area.

11. The method of claim 10, further comprising:
inserting a virtual object image corresponding to the detected object into the virtual reality image.

12. The method of claim 11, further comprising:
displaying the virtual object image corresponding to a non-dangerous element to be different from the virtual object image corresponding to the dangerous element in the virtual reality image.

13. The method of claim 12, wherein the virtual object image comprises a transparent waved-contour image corresponding to the non-dangerous element.

14. The method of claim 11, wherein if the detected object is a real wall, the method further comprises modifying the virtual reality image by inserting a virtual wall image corresponding to the real wall into the virtual reality image.

15. The method of claim 10, further comprising:
modifying the virtual reality image by changing an orientation of the virtual reality image.

16. The method of claim 10, further comprising:
modifying the virtual reality image by displacing a portion of the virtual reality image corresponding to a position of the detected object within the virtual reality image.

17. The method of claim 10, further comprising:
automatically adjusting the response sensitivity of the user input device based on a body size of the user, wherein the user is wearing the glass-type mobile terminal.

18. The method of claim 10, further comprising:
measuring, via a distance sensor of the glass-type mobile terminal, a distance between the glass-type mobile terminal and the detected object; and
determining, via the controller, whether or not the detected object is the dangerous element based on the measured distance.

* * * * *